(12) United States Patent
Fehrenbach et al.

(10) Patent No.: US 12,335,195 B2
(45) Date of Patent: *Jun. 17, 2025

(54) PHYSICALLY SEPARATED CHANNELS FOR NARROWBAND, LOW COMPLEXITY RECEIVERS

(71) Applicant: Fraunhofer-Gesellschaft zur Foerderung der angewandten Forschung e.V., Munich (DE)

(72) Inventors: Thomas Fehrenbach, Berlin (DE); Thomas Wirth, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,392

(22) Filed: Sep. 7, 2022

(65) Prior Publication Data

US 2023/0269051 A1 Aug. 24, 2023

Related U.S. Application Data

(63) Continuation of application No. 16/364,112, filed on Mar. 25, 2019, now Pat. No. 11,457,440, which is a (Continued)

(30) Foreign Application Priority Data

Sep. 26, 2016 (EP) ..................................... 16190658

(51) Int. Cl.
*H04L 5/00* (2006.01)
*H04L 27/26* (2006.01)
(Continued)

(52) U.S. Cl.
CPC .......... *H04L 5/0053* (2013.01); *H04L 5/0094* (2013.01); *H04L 27/2607* (2013.01);
(Continued)

(58) Field of Classification Search
CPC ... H04W 72/0446; H04W 28/06; H04W 4/80; H04W 72/0453; H04W 74/0833;
(Continued)

(56) References Cited

U.S. PATENT DOCUMENTS

2003/0198200 A1 10/2003 Diener et al.
2009/0316643 A1 12/2009 Yamada et al.
(Continued)

FOREIGN PATENT DOCUMENTS

CN 101656700 A 2/2010
CN 103684675 A 3/2014
(Continued)

OTHER PUBLICATIONS

"3GPP TS 36.321 V13.1.0", 3GPP TS 36.321 V13.1.0 (Mar. 2016), p. 42ff.
(Continued)

*Primary Examiner* — Sharmin Chowdhury
(74) *Attorney, Agent, or Firm* — Perkins Coie LLP; Michael A. Glenn

(57) ABSTRACT

A receiver, e.g. an IoT device, receives and processes a radio signal. The radio signal has at least a first frequency band and a second frequency band. The first frequency band includes a first signal, the second frequency band includes a second signal, and each of the first signal and the second signal includes a plurality of frames, each frame having a plurality of subframes (M-subframe). One or more of the subframes of the first signal include connecting information allowing a receiver to establish a connection with a wireless communication system. All of the subframes of the second (Continued)

signal are free of any connecting information. The receiver establishes the connection with the wireless communication system using the connecting information, and, after having established the connection with the wireless communication system and responsive to band information indicating the second frequency band, operate in the second frequency band.

19 Claims, 17 Drawing Sheets

Related U.S. Application Data continuation of application No. PCT/EP2017/074242, filed on Sep. 25, 2017.

(51) Int. Cl.
| | |
|---|---|
| H04W 4/80 | (2018.01) |
| H04W 28/06 | (2009.01) |
| H04W 72/0446 | (2023.01) |
| H04W 72/0453 | (2023.01) |
| H04W 74/0833 | (2024.01) |
| H04W 74/00 | (2009.01) |

(52) U.S. Cl.
CPC .......... *H04L 27/2628* (2013.01); *H04W 4/80* (2018.02); *H04W 28/06* (2013.01); *H04W 72/0446* (2013.01); *H04W 72/0453* (2013.01); *H04W 74/0833* (2013.01); *H04L 5/0007* (2013.01); *H04W 74/002* (2013.01)

(58) Field of Classification Search
CPC .. H04W 74/008; H04L 5/0053; H04L 5/0094; H04L 27/2607; H04L 27/2628; H04L 5/0007

See application file for complete search history.

(56) References Cited

U.S. PATENT DOCUMENTS

| | | |
|---|---|---|
| 2010/0086065 A1 | 4/2010 | Higuchi et al. |
| 2012/0063302 A1 | 3/2012 | Damnjanovic et al. |
| 2013/0114587 A1 | 5/2013 | Khoryaev et al. |
| 2014/0301305 A1 | 10/2014 | Xu et al. |
| 2014/0321370 A1 | 10/2014 | Chen et al. |
| 2014/0341141 A1 | 11/2014 | Nguyen et al. |
| 2015/0092641 A1 | 4/2015 | Koc et al. |
| 2015/0319774 A1 | 11/2015 | Cai et al. |
| 2015/0372779 A1 | 12/2015 | Lim et al. |
| 2016/0037514 A1 | 2/2016 | Xiong et al. |
| 2016/0295609 A1* | 10/2016 | Vajapeyam ............... H04L 5/14 |
| 2017/0013391 A1 | 1/2017 | Rico Alvarino et al. |
| 2017/0202028 A1 | 7/2017 | Gaal et al. |
| 2017/0238292 A1 | 8/2017 | Rico Alvarino et al. |
| 2018/0145802 A1 | 5/2018 | Hwang et al. |
| 2018/0160453 A1 | 6/2018 | Lee et al. |
| 2018/0192313 A1 | 7/2018 | Axmon et al. |
| 2018/0255585 A1* | 9/2018 | Tirronen ............ H04W 74/006 |
| 2019/0044782 A1 | 2/2019 | Zeng et al. |
| 2019/0075602 A1* | 3/2019 | Lin .................... H04L 27/2607 |
| 2019/0174460 A1 | 6/2019 | Zhang et al. |
| 2019/0306887 A1* | 10/2019 | Rathonyi .......... H04W 74/0833 |
| 2020/0396771 A1* | 12/2020 | Liu ....................... H04W 72/21 |

FOREIGN PATENT DOCUMENTS

| | | |
|---|---|---|
| CN | 104348600 A | 2/2015 |
| CN | 104604175 A | 5/2015 |
| CN | 105122715 A | 12/2015 |
| JP | 2013183299 A | 9/2013 |
| JP | 2014143738 A | 8/2014 |
| JP | 2015503264 A | 1/2015 |
| KR | 20070113780 A | 11/2007 |
| KR | 20120139820 A | 12/2012 |
| RU | 2419987 C2 | 5/2011 |
| WO | 2010087172 A1 | 8/2010 |
| WO | 2016047729 A1 | 3/2016 |
| WO | 2016138244 A1 | 9/2016 |
| WO | 2017079539 A1 | 5/2017 |

OTHER PUBLICATIONS

"3GPP TS 36.331 V13.1.0 (Mar. 2016)",—3GPP TS 36.331 V13.1.0 (Mar. 2016), p. 354.

"Standardization of NB-IOT completed", Jun. 22, 2016; http://www.3gpp.org/new-events/3gpp-new/1785-nb_iot_complete, Jun. 22, 2016.

"Support of larger data channel bandwidth", 3GPP TSG RAN WG1 Meeting #86, Aug. 2016, Qualcomm Incorporated, Aug. 22-26, 2016.

\* cited by examiner

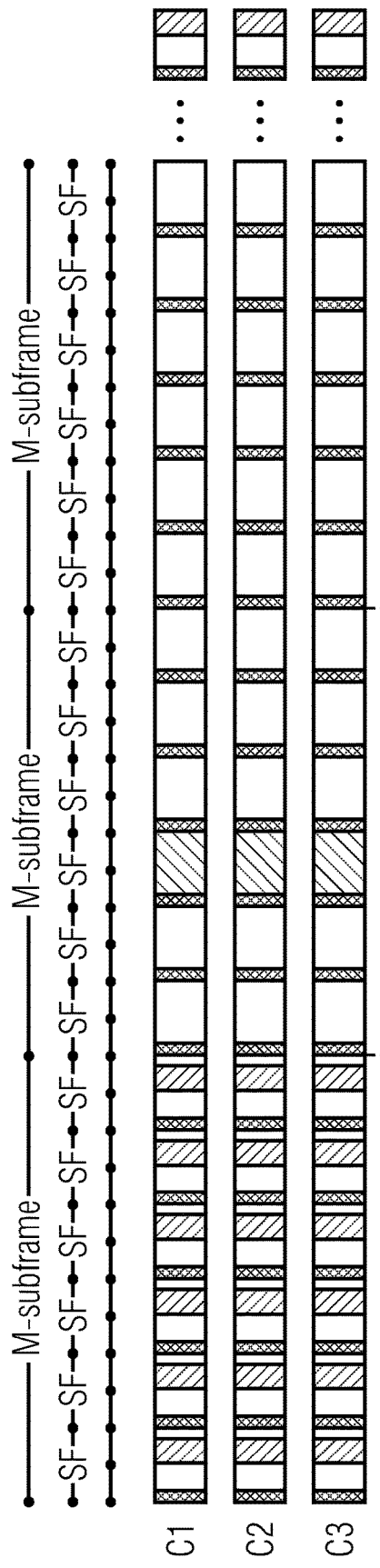
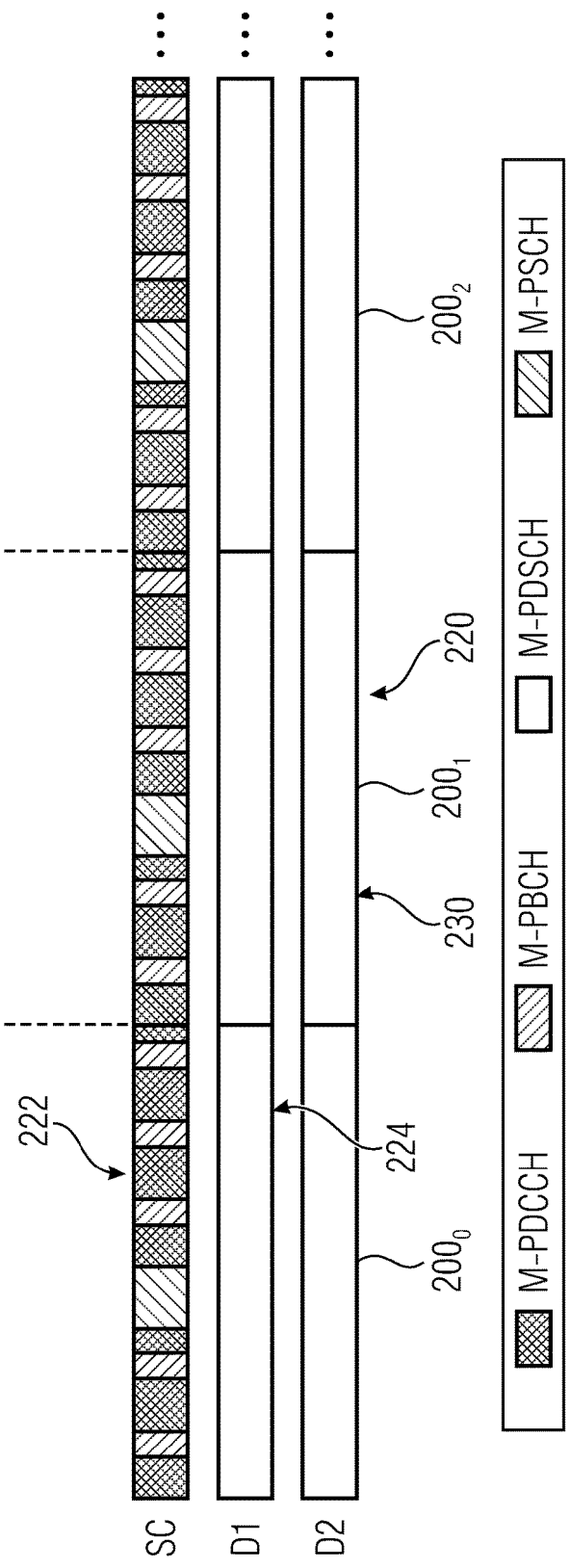
Fig. 8(a)
Fig. 8(b)

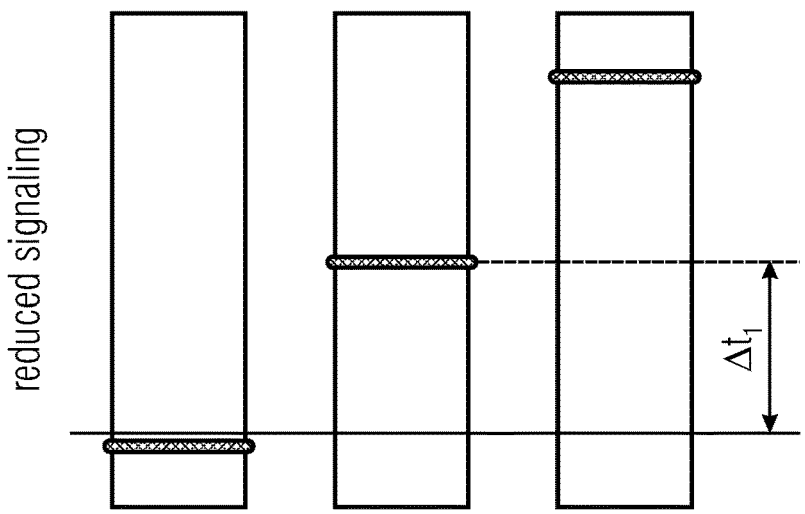
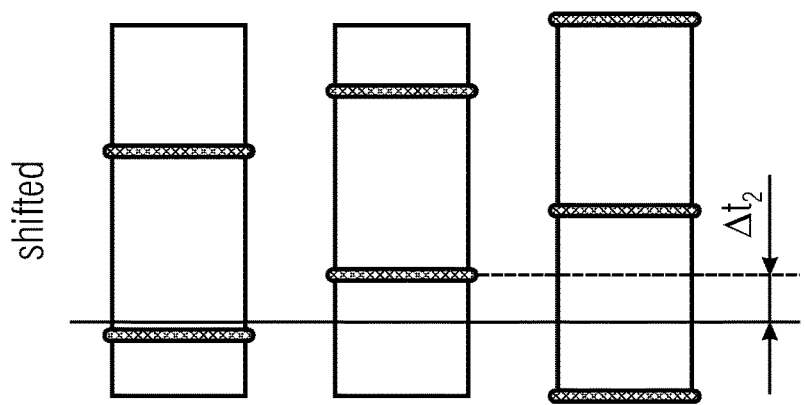
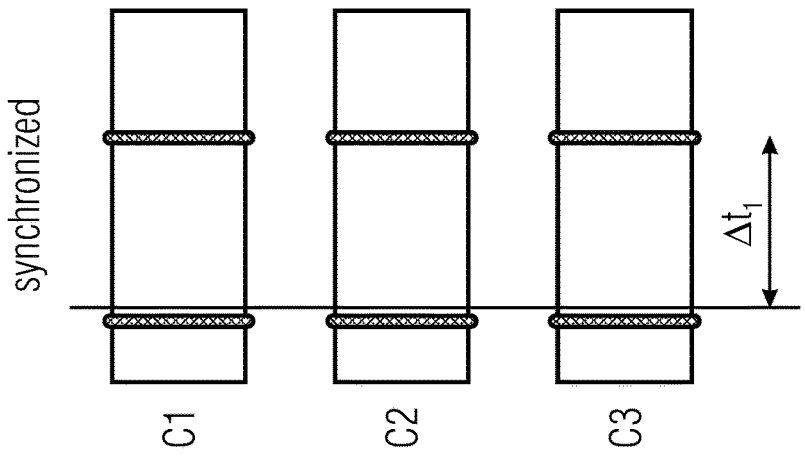

PHYSICALLY SEPARATED CHANNELS FOR NARROWBAND, LOW COMPLEXITY RECEIVERS

CROSS-REFERENCES TO RELATED APPLICATIONS

This application is a continuation of U.S. patent application Ser. No. 16/364,112, filed Mar. 25, 2019, which is a continuation of copending International Application No. PCT/EP2017/074242, filed Sep. 25, 2017, which is incorporated herein by reference in its entirety, and additionally claims priority from European Application No. EP 16190658.1, filed Sep. 26, 2016, which is incorporated herein by reference in its entirety.

The present invention concerns the field of wireless communication networks or systems, more specifically wireless communication networks or systems to be accessed by narrowband, low complexity receivers, like IoT (Internet-of-Things) devices. Embodiments concern narrowband, low complexity receivers, like IoT devices, accessing a wireless communication network using a plurality of physically separated channels.

BACKGROUND OF THE INVENTION

IoT devices may include physical devices, vehicles, buildings and other items having embedded therein electronics, software, sensors, actuators, or the like as well as network connectivity that enable these devices to collect and exchange data across an existing network infrastructure. FIG. 1 is a schematic representation of an example of such a network infrastructure, like a wireless communication system including a plurality of base stations $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. FIG. 1 shows an exemplary view of only five cells, however, the wireless communication system may include more such cells. FIG. 1 shows two users $UE_1$ and $UE_2$, also referred to as user equipment (UE), that are in cell $100_2$ and that are served by base station $eNB_2$. Another user $UE_3$ is shown in cell $100_4$ which is served by base station $eNB_4$. The arrows $102_1$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $105_1$. The IoT device $104_2$ accesses the wireless communication system via the user $UE_3$ as is schematically represented by arrow $105_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), may be used.

Standard LTE devices, like the users $UE_1$, $UE_2$, $UE_3$, operate within a first bandwidth, and the IoT devices $104_1$ and $104_2$ operate within a second bandwidth which is narrower than the first bandwidth. The second bandwidth may be defined in accordance with the NB-IoT enhancement of the LTE Rel. 13 standard, referred to in the following also as NB-IoT. A wireless communication system operating in accordance with the LTE standard may have a system bandwidth of 1.4 MHz, 3.0 MHz, 5 MHz, 10 MHz, 15 MHz, 20 MHz or aggregated system bandwidth consisting of any combination of these, and the bandwidth in accordance with the NB-IoT enhancement of the LTE Rel. 13 standard may be by 200 kHz.

An OFDMA system for data transmission may include an OFDMA-based physical resource grid which comprises plurality of physical resource blocks (PRBs) each defined by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 subframes of 1 ms length, and each subframe includes two slots of 6 or 7 OFDM symbols depending on the cyclic prefix (CP) length.

FIG. 2 shows an exemplary LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. The white boxes 106 represent resource elements allocated to the PDSCH including the payload or user data, also referred to a payload region. The resource elements for the physical control channels (including non-payload or non-user data), also referred to the control region, are represented by the hatched boxes 108. In accordance with examples, resource elements 108 may be allocated to the PDCCH, to the physical control format indicator channel (PCFICH), and to the physical hybrid ARQ indicator channel (PHICH). The cross-hatched boxes 110 represent resource elements which are allocated to the RS that may be used for the channel estimation. The black boxes 112 represent unused resources in the current antenna port that may correspond to RSs in another antenna port. The resource elements 108, 110, 112 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may include symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1 the resource elements associated with symbols 8, 9, 10, 12 and 13 are all allocated to payload data, while for symbols 7 and 11 less resource elements are allocated to payload data.

FIG. 3 shows an example for time units that may be used for the downlink in accordance with the NB-IoT. As mentioned above, NB-IoT may operate within a 200 kHz bandwidth, which corresponds to 12 subcarriers or 1 physical resource block (PRB) in frequency domain. The downlink may be based on orthogonal frequency division multiple access (OFDMA) and may have the same subcarrier spacing, the same OFDM symbol duration, the same slot format, the same slot duration, and the same subframe duration as defined by the LTE standard. The uplink may be based on SC-FDMA (Single Carrier Frequency Division Multiple Access) including a single-tone transmission per user equipment, as a special case of SC-FDMA. In addition, PAPR (Peak-to-Average Power Ratio) reduction techniques may be considered for a multi-tone transmission. Due to the fact that the NB-IoT system bandwidth is only one sixth of the smallest LTE bandwidth (e.g. 6 PRBs for a 1.4 MHz bandwidth system), time units referred to as "M-frame" and "M-subframe" are introduced. FIG. 3 shows a NB-IoT radio frame referred as M-frame and having a length of 60 ms. Each M-frame includes 10 M-subframes 200 each having a duration of 6 ms. Each M-subframe comprises 6 consecutive subframes 202, each subframe having a length of 1 ms. Each subframe 202 has a structure as shown in FIG. 2 and includes two slots 204, each slot including 7 symbols 206, each symbol including the actual signal and a cyclic prefix.

FIG. 4(a) shows an example of the first three M-subframes $200_0$, $200_1$ and $200_2$ of the M-frame of FIG. 3. In a M-subframe, the minimum scheduling unit is 1 PRB (1 ms×180 kHz). Hence, up to 6 users or devices may be scheduled in one of the M-subframes (one user per subframe). Following the principle of LTE, a transport block is mapped to the scheduling units (PRBs) assigned to the user in one M-subframe. Unlike LTE, which spreads the scheduling units, e.g. 6 PRBs in a 1.4 MHz bandwidth system, in the frequency dimension, NB-IoT applies a time expansion approach to spread the scheduling units in time dimension. FIG. 4(a) further shows how NB-IoT resource elements are mapped to the respective LTE downlink physical channels and physical signals. In a similar was as LTE also NB-IoT may include the following LTE physical channels:

M-PBCH: including broadcast of system information
M-PDSCH: including downlink UE data and control information
M-PDCCH: including downlink control information, for example scheduling information
M-PSCH: including the primary synchronization signal (PSS) and the secondary synchronization signal (SSS) used to obtain time and frequency synchronization with the wireless communication network.

Each of the M-subframes includes 6 subframes $202_0$ to $202_5$ having a structure similar to that described above with reference to FIG. 2. The LTE physical channels and physical signals are distributed as depicted in FIG. 4(a). Each of the subframes $202_0$ to $202_5$ in the first M-subframe $200_0$ includes at the beginning resource elements defined by the first OFDM symbol and the 12 subcarriers which are mapped to the M-PDCCH. Each subframe may further include resource elements mapped to the M-PBCH, to the M-PDSCH, as well as resource elements mapped to the reference signals CRS. The second M-subframe $200_1$ also includes 6 subframes $202_0$ to $202_5$, each subframe including resource elements at the first OFDM symbol mapped to the M-PDCCH. Further, each of the subframes includes resource elements mapped to the reference signals CRS. In subframes $202_0$, $202_1$, $202_3$, $202_4$ and $202_5$ substantially all of the resource elements are mapped to the M-PDSCH, except for those resource elements mapped to M-PDCCH and the mapped to the reference signals CRS. In the subframe $202_2$ substantially all resource elements are mapped to the M-PSCH including the secondary and primary synchronization signals, except for those resource elements mapped to M-PDCCH and the mapped to the reference signals CRS. In the third M-subframe $200_2$ also 6 subframes $202_0$ to $202_5$ are provided all including resource elements being mapped to the M-PDSCH, except for those resource elements mapped to M-PDCCH and the mapped to the reference signals CRS. The remaining M-subframes $200_3$ to $200_9$ forming the M-frame shown in FIG. 3 are not shown in FIG. 4(a). FIG. 4(b) shows all M-subframes $200_0$ to $200_9$ of a M-frame. M-subframes $200_4$, $200_5$, $200_7$ and $200_9$ have the same structure as the third M-subframe $202_2$, i.e., include, besides the control information in the first resource elements and the reference signals only resource elements mapped to the M-PDSCH. M-subframes $200_3$, $200_6$ and $200_8$ have substantially the same structure as the second M-subframe $200_1$, except that in M-subframes $200_3$ and $200_8$ the primary and secondary synchronization signals are in the last subframe $202_5$.

Thus, in the above example, in the first M-frame 200o the resource elements are mapped to the M-PBCH, however no resource elements are mapped or allocated to the M-PBCH in second and third M-subframes $202_1$ and $202_2$. The primary and secondary synchronization signals PSS and SSS of the M-PSCH are transmitted in the second, fourth, seventh and ninth M-subframes $200_1$, $200_3$, $200_6$ and $200_8$ but not in first M-subframe 200o and also not in any of the M-subframes $200_2$, $200_4$, $200_5$, $200_7$ and $200_9$ following the second M-subframe $200_1$. In the M-subframes $200_1$, $200_3$, $200_6$ and $200_8$ the PSS and SSS are arranged in continuous OFDM symbols (see the symbols 206 in FIG. 4(b)). The M-PDCCH is distributed across the M-subframes, more specifically in the example of FIG. 4(a) and FIG. 4(b), resource elements at the first OFDM symbol in each M-subframe are mapped to the M-PDCCH. To avoid buffering of M-PDSCH symbols while receiving M-PDCCH symbols, a forward scheduling method may be used for NB-IoT, and the M-PDCCH scheduling information given in a M-subframe may be applicable to M-PDSCH that starts at least one M-subframe later.

Three operating modes for NB-IoT are now described with reference to FIG. 5, namely the in-band LTE operation mode, the standalone GSM operation mode, and the LTE guard band operation mode. FIG. 5 is a schematic representation of the different operating modes in accordance with NB-IoT, also referred to as the NB-IoT. FIG. 5(a) shows the in-band LTE operation mode in accordance with which a NB-IoT carrier or frequency band 300, also referred to as a NB-IoT channel, is deployed within the LTE carrier or frequency band 301. FIG. 5(b) shows the standalone GSM operation mode placing the NB-IoT frequency band 300 among a plurality of GSM carriers 302. The NB-IoT frequency band 300 is separated by a guard band from the GSM carriers. FIG. 5(c) shows the LTE guard band operation mode, in accordance with which the NB-IoT carrier 300 is placed in one of the LTE guard bands provided at both ends of the carrier of the standard LTE.

A receiver operating in accordance with NB-IoT, for example a stationary or mobile IoT device or another LTE legacy user, needs to establish a connection with a wireless communication network, like the one depicted in FIG. 1, to receive or send information. For setting up the connection to the network, the receiver is tuned to listen to the NB-IoT frequency band to find the primary synchronization signal PSS and the secondary synchronization signal SSS which allow the receiver to synchronize on a subframe level and to obtain a physical layer cell identity group number. Following this synchronization procedure, the receiver will proceed to read system information, e.g. from the master information block (MIB) provided in the M-PBCH. FIG. 6 shows the distribution of the M-subframes including information for establishing a connection over a plurality of M-frames. The first M-subframes $200_0$ are provided at the beginning of each M-frame, followed by the second M-subframes $200_1$. When listening to a radio signal transmitted in the NB-IoT frequency band or on the NB-IoT channel, PSS and SSS are received on average every ms, and occur 4 times within a 60 ms M-frame (see FIG. 3 and FIG. 4). The system information is transported in parts of every M-subframe 0 in each M-frame via M-PBCH every 60 ms, which has a transmission time interval (TTI) of 240 ms. Thus, establishing a connection of a receiver, like an IoT device, operating in accordance with NB-IoT may be delayed as the remaining M-subframes $200_2$ to $200_9$ do not include any resource elements mapped to connection and system information. Also, when serving a plurality of IoT devices, the 6 PRBs in the M-frame need to be shared among the IoT devices which may lead to further delays when receiving/transmitting data. Thus, synchronization, random access and activity time when connecting and transmitting on a NB-IoT channel or a NB-IoT frequency band may be quite high. Further, even when using more than one NB-IoT channel or NB-IoT frequency band, for example, for increasing the number of IoT devices to be served, each of the channels has the same structure.

SUMMARY

One embodiment may have a receiver, wherein the receiver is configured to receive and process a radio signal, the radio signal including at least a first frequency band and a second frequency band, the first frequency band including a first signal, the second frequency band including a second signal, and each of the first signal and the second signal including a plurality of frames, each frame having a plurality of subframes, wherein one or more of the subframes of the first signal includes connecting information allowing a receiver to establish a connection with a wireless communication system, wherein all of the subframes of the second signal are free of any connecting information so that a receiver listening to the second signal cannot set up a connection with the wireless communication system, and wherein the receiver is configured to establish the connection with the wireless communication system using the connecting information, and, after having established the connection with the wireless communication system and responsive to band information indicating the second frequency band, to operate in the second frequency band.

According to another embodiment, a radio signal may have: at least a first frequency band and a second frequency band, the first frequency band including a first signal, the second frequency band including a second signal, and each of the first signal and the second signal including a plurality of frames, each frame having a plurality of subframes, wherein one or more of the subframes of the first signal includes connecting information allowing a receiver to establish a connection with a wireless communication system, and wherein all of the subframes of the second signal are free of any connecting information so that a receiver listening to the second signal cannot set up a connection with the wireless communication system.

Another embodiment may have a transmitter, wherein the transmitter is configured to transmit a radio signal, the radio signal including at least a first frequency band and a second frequency band, the first frequency band including a first signal, the second frequency band including a second signal, and each of the first signal and the second signal including a plurality of frames, each frame having a plurality of subframes, wherein one or more of the subframes of the first signal includes connecting information allowing a receiver to establish a connection with a wireless communication system, and wherein all of the subframes of the second signal are free of any connecting information so that a receiver listening to the second signal cannot set up a connection with the wireless communication system.

According to another embodiment, a wireless communication system may have: an inventive receiver and an inventive transmitter.

According to another embodiment, a method may have the steps of: receiving and processing, by a receiver of a wireless communication system, a radio signal, the radio signal including at least a first frequency band and a second frequency band, the first frequency band including a first signal, the second frequency band including a second signal, and each of the first signal and the second signal including a plurality of frames, each frame having a plurality of subframes, wherein one or more of the subframes of the first signal includes connecting information allowing a receiver to establish a connection with a wireless communication system, and wherein all of the subframes of the second signal are free of any connecting information so that a receiver listening to the second signal cannot set up a connection with the wireless communication system, establishing a connection of the receiver with the wireless communication system using the connecting information, and after having established the connection with the wireless communication system, operating the receiver in the second frequency band responsive to band information indicating the second frequency band.

According to another embodiment, a method may have the steps of: transmitting, by a transmitter of a wireless communication system, a radio signal, the radio signal including at least a first frequency band and a second frequency band, the first frequency band including a first signal, the second frequency band including a second signal, and each of the first signal and the second signal including a plurality of frames, each frame having a plurality of subframes, wherein one or more of the subframes of the first signal includes connecting information allowing a receiver to establish a connection with a wireless communication system, and wherein all of the subframes of the second signal are free of any connecting information so that a receiver listening to the second signal cannot set up a connection with the wireless communication system.

According to another embodiment, a method may have the steps of: transmitting, by a transmitter of a wireless communication device, a radio signal, the radio signal including at least a first frequency band and a second frequency band, the first frequency band including a first signal, the second frequency band including a second signal, and each of the first signal and the second signal including a plurality of frames, each frame having a plurality of subframes, wherein one or more of the subframes of the first signal includes connecting information allowing a receiver to establish a connection with a wireless communication system, and wherein all of the subframes of the second signal are free of any connecting information so that the receiver listening to the second signal cannot set up a connection with the wireless communication system, receiving and processing, by a receiver of the wireless communication system, the radio signal, establishing a connection of the receiver with the wireless communication system using the connecting information, and after having established the connection with the wireless communication system, operating the receiver in the second frequency band responsive to band information indicating the second frequency band.

According to another embodiment, a non-transitory computer program product including a computer readable medium storing instructions which, when executed on a computer, perform the inventive methods.

BRIEF DESCRIPTION OF THE DRAWINGS

Embodiments of the present invention will be detailed subsequently referring to the appended drawings, in which:

FIGS. 4(a) and (b) shows an example of the M-frame of FIG. 3, wherein FIG. 4(a) shows the first three M-subframes of the M-frame, and how NB-IoT resource elements are mapped to the respective LTE downlink physical channels and physical signals.

FIG. 5(a) to (c) is a schematic representation of different operating modes in accordance with NB-IoT, wherein FIG. 5(a) shows an in-band LTE operation mode, FIG. 5(b) shows a standalone GSM operation mode, and FIG. 5(c) shows a LTE guard band operation mode;

FIGS. 8(a) and (b) shows an embodiment of the inventive approach in which the radio signal includes three frequency bands or channels, one dedicated to include synchronization information, system information and control channel information, and the others dedicated to the downlink shared data channel, wherein FIG. 8(a) shows a conventional approach, and FIG. 8(b) shows details of the inventive approach;

FIGS. 11(a) and (b) shows an example of an NB-IoT system using a dedicated M-RACH channel, wherein FIG. 11(a) shows a conventional approach for signaling the M-RACH channel.

FIG. 12(a) to (c) describes embodiments for shifted random access slots by reorganizing the M-RACH and UL resources in conventional IoT bands, wherein FIG. 12(a) shows a conventional arrangement of the random access sequence in a NB-IoT signal, FIG. 12(b) shows random access information shifted with respect to each other, and FIG. 12(c) shows random access information shifted staggered in the frequency bands;

DETAILED DESCRIPTION OF THE INVENTION

In the following, advantageous embodiments of the present invention are described in further detail with reference to the enclosed drawings in which elements having the same or similar function are referenced by the same reference signs.

Figure 2:
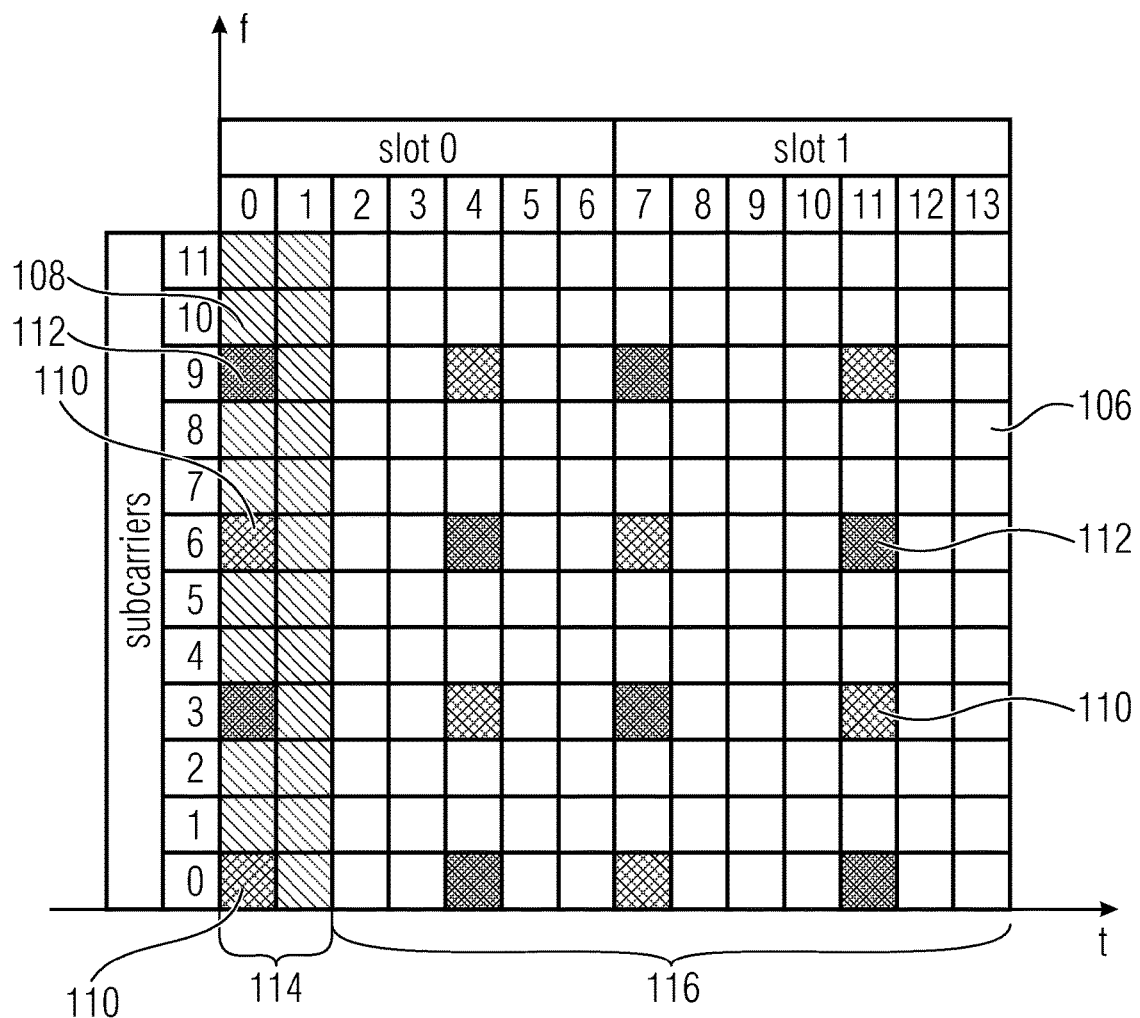
FIG. 2 shows an exemplary OFDMA-subframe for two antennas ports as it may be used for a conventional LTE downlink communication.
Figure 3:
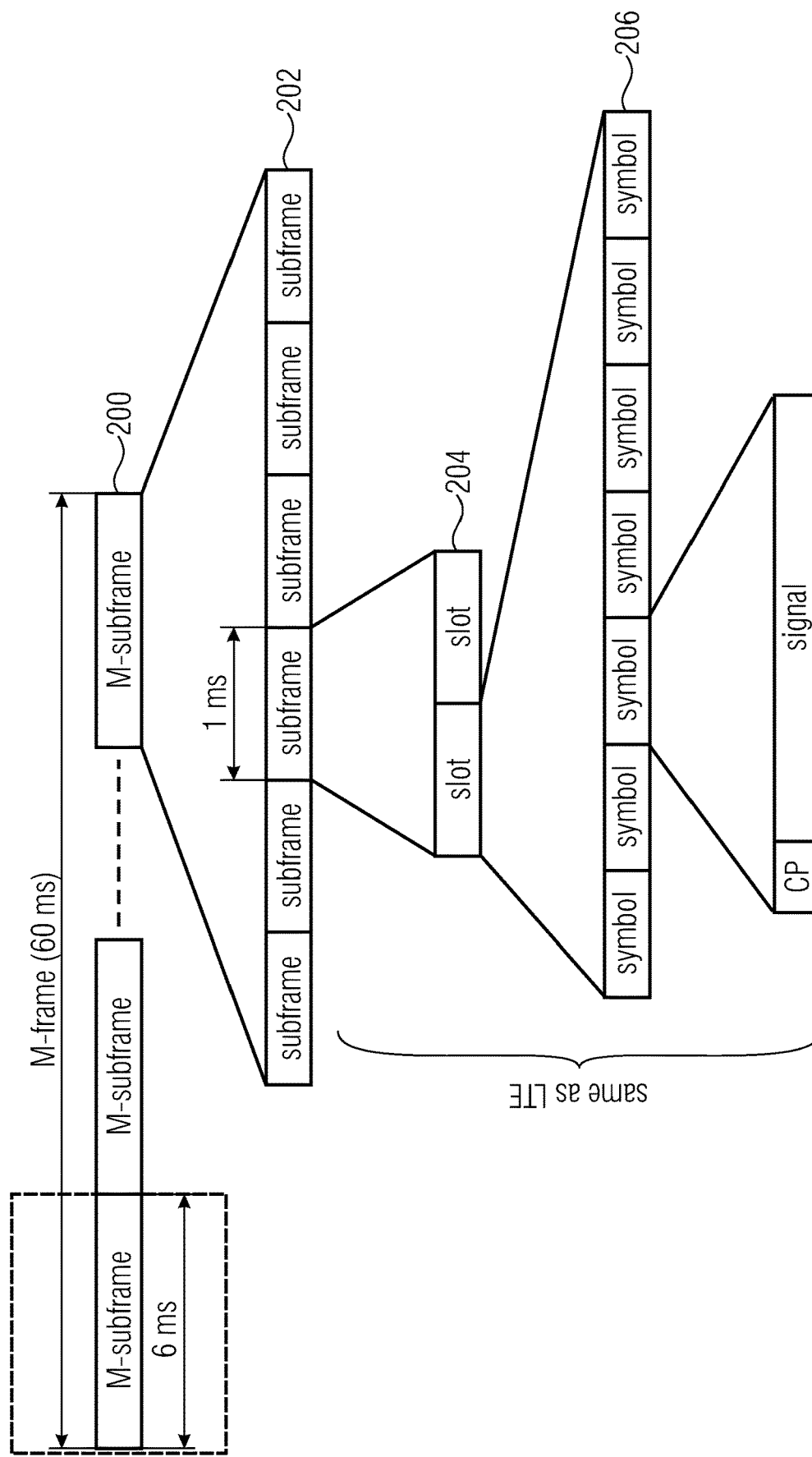
FIG. 3 shows an example for time units that may be used for the downlink in accordance with the NB-IoT.
Figure 7:
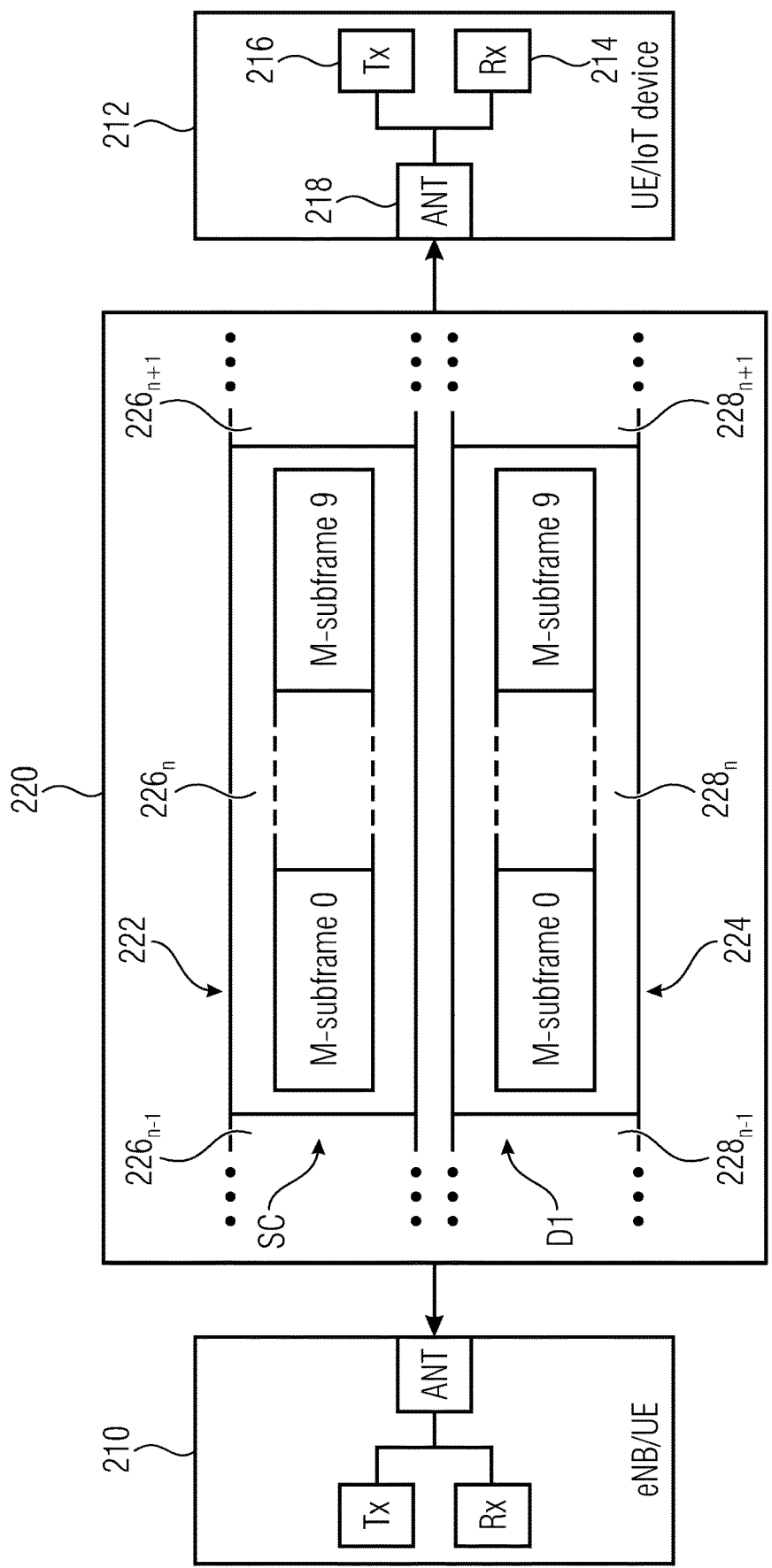
FIG. 7 is a schematic representation of a radio transmission between a transmitter and a receiver of a wireless communication network as described above with reference to FIG. 1 using a radio signal in accordance with embodiments of the present invention.

FIG. 7 is a schematic representation of a radio transmission between a transmitter 210 and a receiver 212 of a wireless communication network described above with reference to FIG. 1. The transmitter 210 may be a base station eNB or a user equipment, and the receiver 212 may be an IoT device or another user equipment operating in accordance with the NB-IoT. The receiver 212 includes a receiving section 214 and a transmitting section 216 both coupled to an antenna 218. The receiver 212, via the antenna 218, receives a radio signal from the transmitter 210, and the radio signal is indicated in FIG. 7 at 220. The radio signal includes a first frequency band SC, also referred to as a first channel or first carrier, and a second frequency band D1, also referred to as a second channel or second carrier. Each of the frequency bands SC, D1 include or carry a signal. The first frequency band SC includes a first signal 222 having a plurality of M-frames $226_{n-1}$, $226_n$ and $226_{n+1}$. The second frequency band D1 includes a second signal 224 having a plurality of M-frames $228_{n-1}$, $228_n$ and $228_{n+1}$. In accordance with embodiments, the first signal may be a legacy LTE Rel. 13 NB-IoT carrier which supports legacy users. In accordance with the present invention, the first signal may transport new system information for new users with a reference to a second/third/fourth narrowband carrier as described herein. The number of M-frames may be more or less than those depicted in FIG. 7. Each of the M-frames includes 10 M-subframes, each of which has a structure as explained above with reference to FIGS. 2 and 3, i.e., each subframe, in accordance with the depicted embodiment, includes a plurality of resource symbols defined by one of the subcarriers and one of the OFDM symbols.

Other than in approaches of conventional technology, in which the first resource elements in each M-subframe are mapped or allocated to control information in the M-PDCCH, and the other resource elements are mapped to at least one of the M-PBCH, the M-PSCH, the M-PDSCH, the or M-PUSCH (Physical Uplink Shared CHannel) or the M-RACH (Random Access CHannel), in accordance with the inventive approach, at least one of the signals in the first and second frequency bands SC, D1 is dedicated to single or multiple pre-defined functionalities. For example, the M-subframes of the first signal 222 may include connecting information, like the above referenced synchronization channel including the primary and/or secondary synchronization signals and system information, whereas the second signal 224 has subframes all of which are free of any connecting information. The receiver 212 processes the received radio signal 220 and listens to the first frequency band SC in which the first signal 222 is transmitted to receive the connecting information allowing the receiver 212 to establish a connection with the wireless communication network by setting up, for example, a radio communication with the transmitter 210. In other words, in accordance with the inventive approach, connecting information allowing the receiver 212 to establish a connection to the communication network is provided not provided in the second signal 224 in the second frequency band D1, so that any receiver listening not to the first frequency band SC, is not in a position to set up a connection with the transmitter 210. Only once the connecting information that may be used has been obtained will the receiver also be informed, by the band information, about the second frequency band D1 to be used for receiving/transmitting further information or data.

In accordance with the inventive approach, the connecting information may be placed within the M-subframes of the first signal 222 at shorter intervals than in the above described approach of conventional technology which allows for a synchronization of the receiver 212 with the wireless communication network with a reduced delay. In the one or more M-subframes of the first signal 222 resource elements may be mapped to the connecting information. In addition, resource elements in the M-subframes of the first signal 222 are mapped to band information indicating the second frequency band D1 including the second signal 224. The receiver 212, after having synchronized with and established the connection to the communication system, on the basis of the band information, operates in the second frequency band D1, i.e., the receiving section 214 processes the second signal 224, for example by tuning the receiving section 214 on the basis of the band information from the first frequency band SC to the second frequency band D1. In other embodiments, the receiving section 214 may be operated so as to listen simultaneously to the first and second frequency bands SC, D1, and once the connection with the wireless communication network has been established, the second signal 224 in the second frequency band D1 will be processed. In yet other embodiments, the receiving section 214 may be operated in a full duplex mode, rather than in the just described half-duplex mode, so as to listen to one or more carriers while transmitting on one or more other carriers. Base stations in NR may also transmit and receive on the same frequency in a full-duplex mode.

In accordance with embodiments, the second signal 224 may the M-PDCCH as well as resource elements mapped to the M-PDSCH, M-PUSCH and M-RACH. After being directed from the first signal 222 to the second signal 224, the receiver 212 operates in accordance with the control information received on the second signal, performs the steps for accessing the network using the M-RACH, and receives/transmits data on the resource elements provided in the M-PDSCH and the M-PUSCH.

Figure 5C:
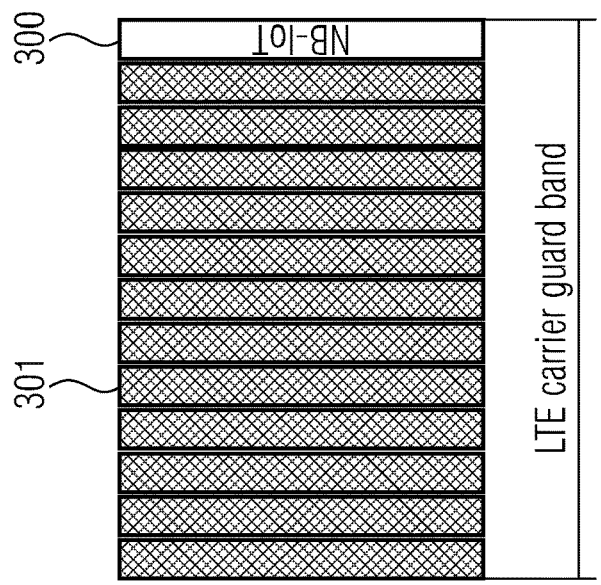
Figure 5B:
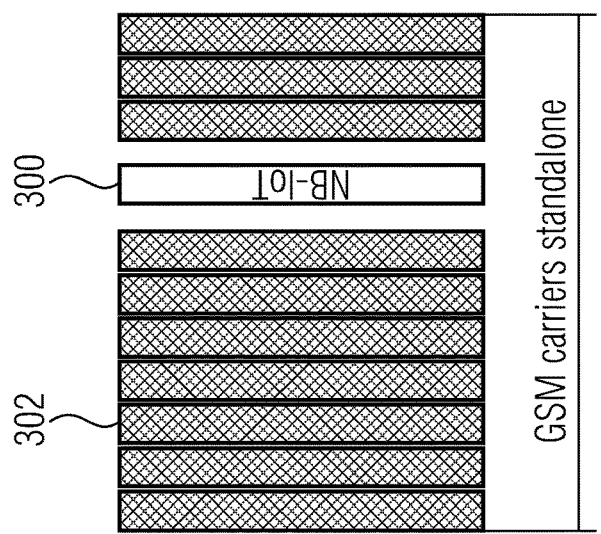

Thus, the inventive approach allows mapping single or multiple pre-defined functionalities onto one or more NB-IoT frequency bands or channels, each having, for example, a bandwidth of 200 kHz. The inventive approach allows aggregating several of the 200 kHz carriers (bands) for the same functionality. For example, if the NB-IoT carrier is allocated inside the LTE guard band (see FIG. 5(c) above), two NB-IoT carriers may be utilized, the one on the right and the one on the left of the LTE component carrier. These guard band NB-IoT carriers may be operated simultaneously to the "normal" LTE band and may provide additional information or more robust information for UEs operating as a narrowband or broadband device. Further, additional information may be provided. Furthermore, NB-IoT carriers can be allocated and aggregated in the duplex gap between a downlink and uplink FDD component carrier, e.g. in a LTE or UMTS FDD system.

In accordance with embodiments, the first frequency band SC including the first signal 222, may be dedicated to include, together with the band information, only synchronization channel information and broadcast information needed for setting up a connection to the wireless communication network, for example, the M-PSCH and The M-SSCH including the primary and/or secondary synchronization signals PSS, SSS and the broadcast channel M-PBCH. The second signal 224 may be a dedicated channel including one or more of system information, control information (M-PDCCH), the M-PDSCH, the M-PUSCH or the M-RACH.

In accordance with other embodiments, more than two frequency bands may be used, for example, a third frequency band and fourth frequency band including a third signal and a fourth signal, respectively, which are dedicated signals including only one of the above information. In accordance with yet other embodiments, related channels may be combined, for example channels related to a specific user so that, for example, the second signal 224 includes data and control messages for the specific receiver 212. In other embodiments, channels related to the transmission may be combined, for example, the first signal 222 may be used for synchronization, system information and control information transmission as well as for providing the M-PDSCH, whereas the second signal 224 is used for the uplink only, like the M-RACH and the PUSCH.

In accordance with embodiments, a load balancing approach may be provided, in accordance with which the system information or band information in the first signal 222 indicate to different receivers the second frequency band D1 or a third and fourth frequency band to be used by the specific receiver for obtaining control information and random access channel information, thereby balancing the traffic in the respective bands or channels. For example, specific receivers 212, like IoT devices providing alerts, may be signaled a frequency band that is reserved for the communication with such kinds of devices. In accordance with other embodiments, the system information may randomly assign the second, third or fourth frequency bands for a receiver 212 connecting to the network, thereby providing random choice. A weighted random choice may also be provided.

In accordance with other embodiments, one of the frequency bands may be used as an anchor channel, may provide hopping sequence information or a reconfiguration message for the receiver 212.

FIG. 8 shows an embodiment of the inventive approach in which the radio signal includes three frequency bands or channels SC, D1, D2, one channel SC dedicated to include synchronization information, system information and control channel information, and the other channels D1, D2 dedicated to the downlink shared data channel. FIG. 8(a) shows a conventional approach, and FIG. 8(b) shows details of the inventive approach.

Figure 4A:
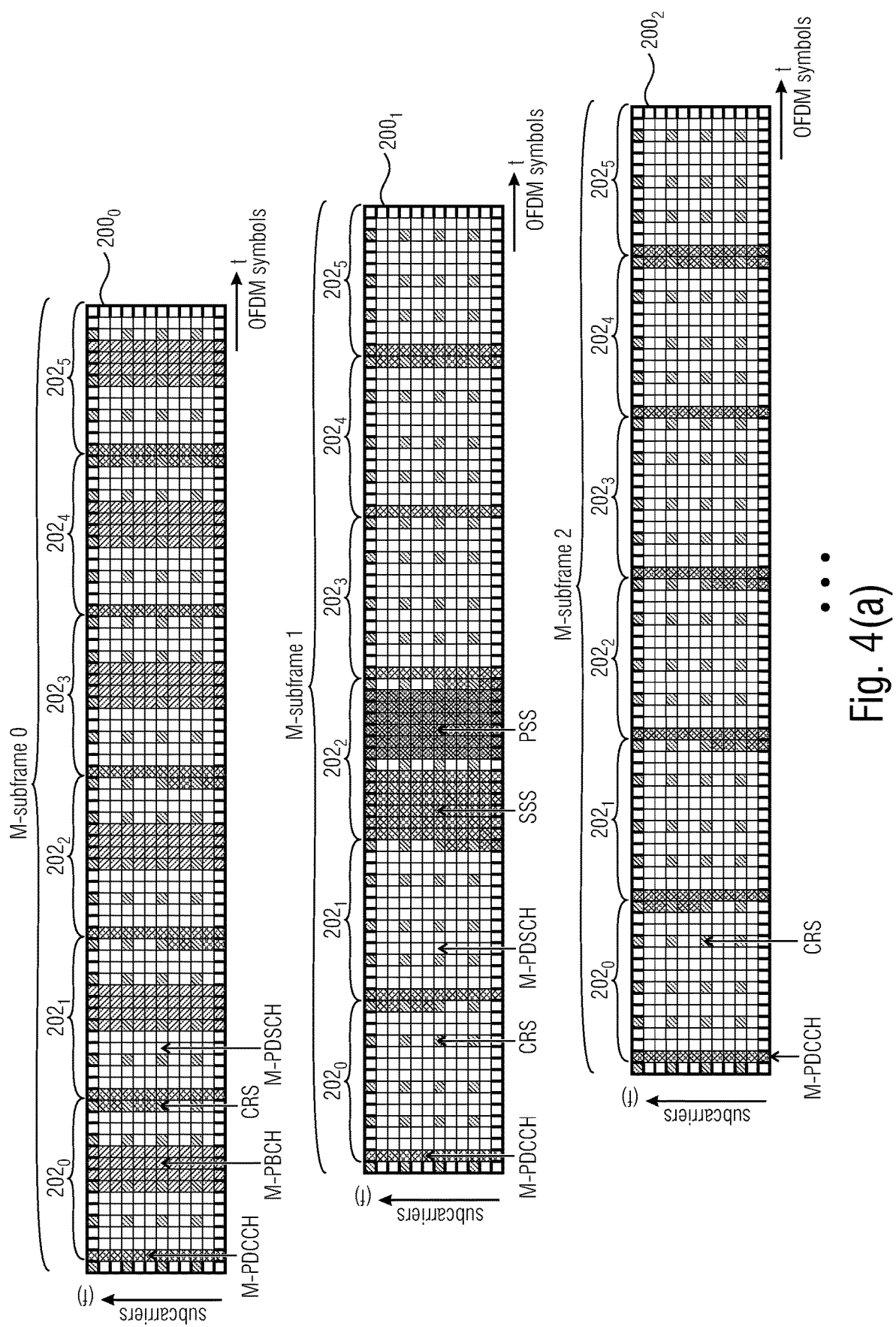
Figure 4B:
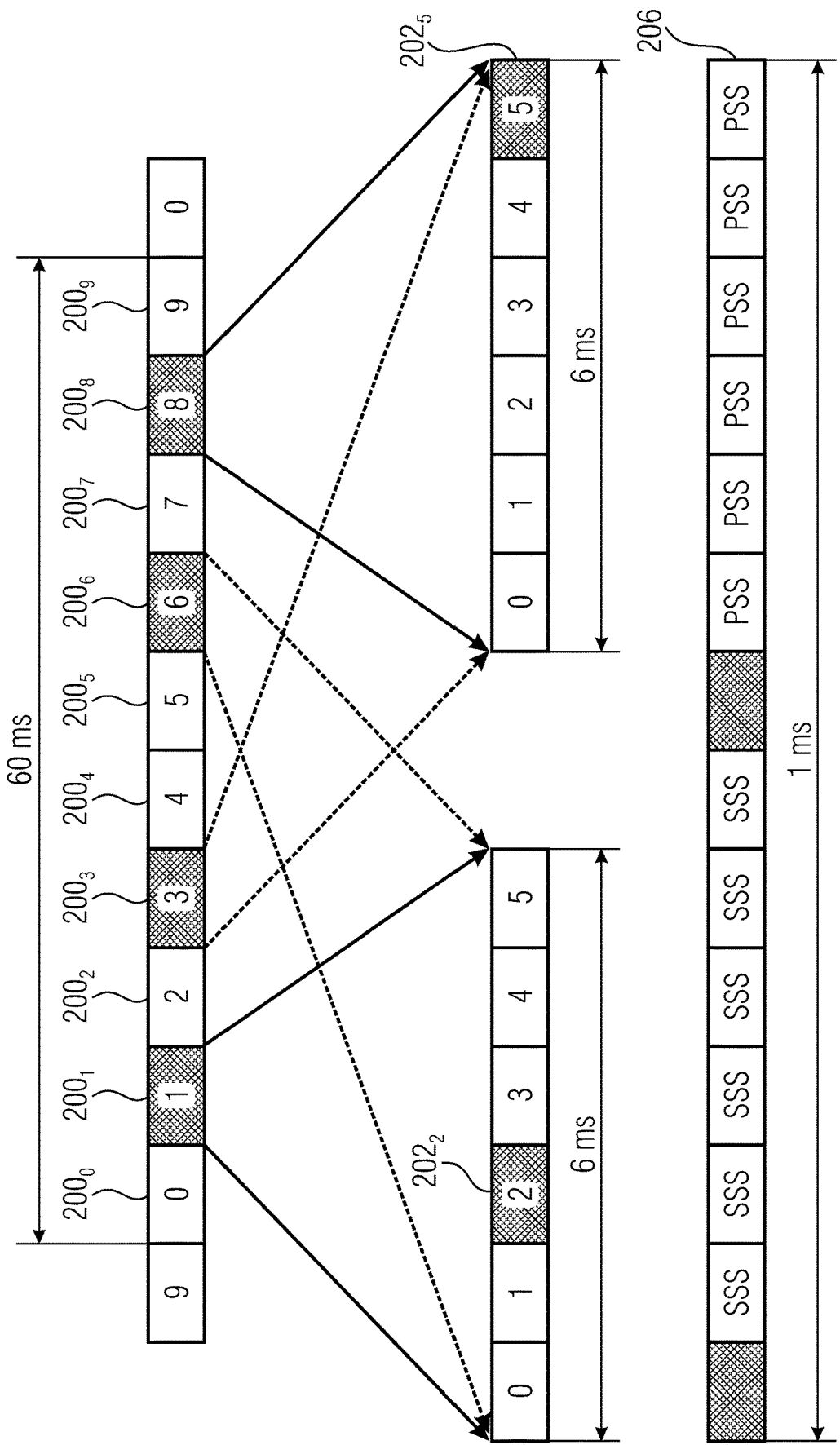
FIG. 4(b) shows all M-subframes of the M-frame.

FIG. 8(a) shows three channels or frequency bands C1-C3 operating in accordance with the conventional NB-IoT. For each of the channels C1-C3, three M-subframes $200_0$-$200_2$ are shown. Each channel has the same structure in that the first M-frame subframes $200_0$, besides the M-PDCCH and the M-PDSCH also includes the M-PBCH. The subsequent M-subframes do not include the broadcast information and only the second M-subframe $200_1$ includes the M-PSCH. The structure of each of the channels C1-C3 corresponds to the one shown in FIG. 4. Thus, each of the channels C1-C3 includes information covering the entire functionality to be provided to a receiver.

FIG. 8(b) shows an embodiment in accordance with the inventive approach mapping single or multiple pre-defined functionalities onto several NB-IoT bands or channels. Like in FIG. 8(a) three frequency bands or channels SC, D1, D2 for serving an IoT device are used. Again, three consecutive M-subframes $200_0$-$200_2$ are shown. When compared to FIG. 8(a), each of the frequency bands SC, D1, D2 is a dedicated frequency band or channel. For example, the first channel SC may be referred to as a synchronization channel and, other than in FIG. 8(a), the first channel SC includes in each M-subframe $200_0$-$200_2$ the M-PSCH and the M-PBCH. Further the PDCCH is provided in each of the M-subframes $200_0$-$200_2$. The receiver 212 (see FIG. 7) is tuned to the first frequency band SC including the synchronization channel SC and, on the basis of the synchronization and broadcast information, may establish a connection to the communication network, for example to the transmitter 210 (see FIG. 7). In addition, further information provided in the synchronization channel SC informs the receiver about further frequency bands that are available. Thus, in accordance with the embodiment of FIG. 8(b), the first signal in the synchronization channel SC is such that one or more of the M-subframes of each M-frame includes connecting information allowing to make a connection to the network. In accordance with other embodiments, the synchronization channel may only include, in each M-subframe, the connecting information together with the band information informing the receiver about the further frequency bands that are available. The connecting information may be transmitted continuously in each M-subframe or may be transmitted intermittently, e.g., in $n^{th}$ M-subframe. The latter case, when the transmitter is a battery operated device, e.g., another UE, the synchronization information is only sent out at specific times so as to reduce the energy consumption at the transmitter.

The second and third frequency bands D1, D2 or channels D1, D2 are dedicated to the M-PDSCH, and neither of the sub-frames of the second and third signal 224, 230 in the second and third frequency band D1, D2 includes any connecting information. Once the receiver made a connection to the communication network, the receiver tunes to one of the frequency bands D1, D2 or both of the frequency bands D1, D2 so as to receive and process data provided on these channels D1, D2 in the downlink.

In the embodiment of FIG. 8, in accordance with the inventive approach, specific information to be provided to a receiver 212 is send via separate physical narrowband channels. An advantage of the inventive approach is that it makes the overall system more scalable. For example, in case more controlled bandwidth is needed, a further channels may be added, e.g. a channel having resource elements mapped only to the M-PDCCH or an additional synchronization channel. Another advantage of the inventive approach is that, due to providing the synchronization and system information in the dedicated synchronization band SC, the cell search procedure at the receiver 212 is faster and less complex. For example, to improve the access proves, a dedicated channel for the M-RACH may be used, thereby speeding up the random access procedure. Yet another advantage of the inventive approach is that it scales. For example, 1 . . . n of the available frequency bands or channels may be aggregated in the frequency domain, also referred to as NB-IoT carrier aggregation, and in case additional capacities are needed, additional channels may be introduced.

In the example of FIG. 8(b), using the synchronization channel SC or using more than one of these synchronization channels provides the synchronization information with at least basic system information pointing, for example, to further system information on a different channel. In addition to the synchronization information transported on the synchronization channel SC, in the embodiment of FIG. 8, further information is transmitted on this channel. In accordance with other embodiments, data may also be transmitted on this channel as well. The system information includes the information that may be used about the cell, for example the FFT size, etc., and the position of further channels and the function of these further channels. For UEs supporting narrowband aggregation and being able to process multiple control channels at the same time, control data may be split onto several frequency bands which may allow for a better resource utilization of the control channels. The basic system parameters may include the cell ID, an operation mode, a position of further NB-IoT channels or LTE bands and an access barring flag. By signaling the further band, the UE may switch onto one of these bands after synchronizing and decoding the system information block (SIB), and as there is a dedicated narrow band, the synchronization and system information blocks may be transmitted more frequently.

The channels D1, D2, as depicted in FIG. 8(b), may be dedicated DL data channels on which DL data is transmitted and the IoT device jumps to the respective band after receiving a DL grant. The channels D1, D2 are signaled to the IoT device by the system information. In addition, these channels may be used by non-IoT devices, for example, LTE users in case no IoT devices are scheduled for these bands. The above mentioned system information, in accordance with embodiments, may also advertise channels having remaining capacity or advertise a priority/likelihood of a UE choosing such a channel. Additionally, the channels may be advertised for certain UE groups or special functions, for example emergency M-RACH to allow specific devices which need to set up a connection to the system immediately to use these cases.

Figure 9:
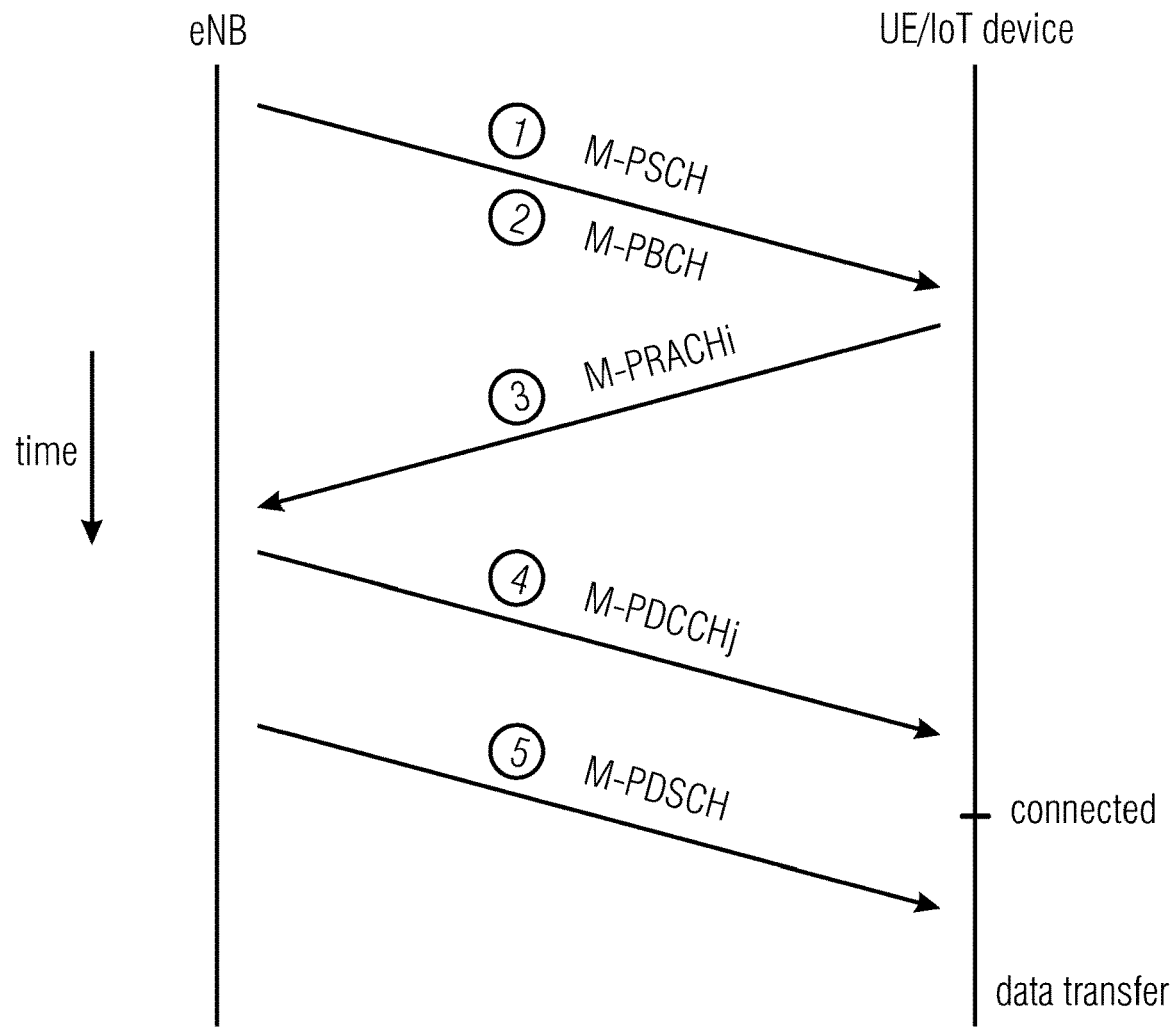
FIG. 9 shows an example for connecting a receiver to a communication network in accordance with the inventive approach using dedicated frequency bands as shown in FIG. 8(b) including additional bands for the M-RACH.

FIG. 9 shows an example for connecting a receiver to the communication network, more specifically to a base station thereof, using an NB-IoT system in accordance with the inventive approach using dedicated frequency bands, for example a system as shown in FIG. 8(b) including additional bands for the random access channel and for the control channel. The UE, initially, searches ①channels for PSS and SSS signals which are used also for an initial time and frequency synchronization. Having received such synchronization signals, the UE decodes ② system information from the M-PBCH, for example the M-RACH to M-PDCCH mapping. In addition, access barring and/or special channels for high priority/emergency access may be signaled. The random access is performed ③ on the band i specified in the system or band information, and the UE decodes ④ the control information on the M-PDCCH on band j depending on the above mentioned M-RACH to M-PDCCH mapping which completes the connection process. At this time, as shown in FIG. 9, the IoT device is connected to the communication network. Data may now be transmitted ⑤ in the M-PDSCH which may be provided on a separate frequency band as indicated, either by the control information or by the system information.

Figure 10:
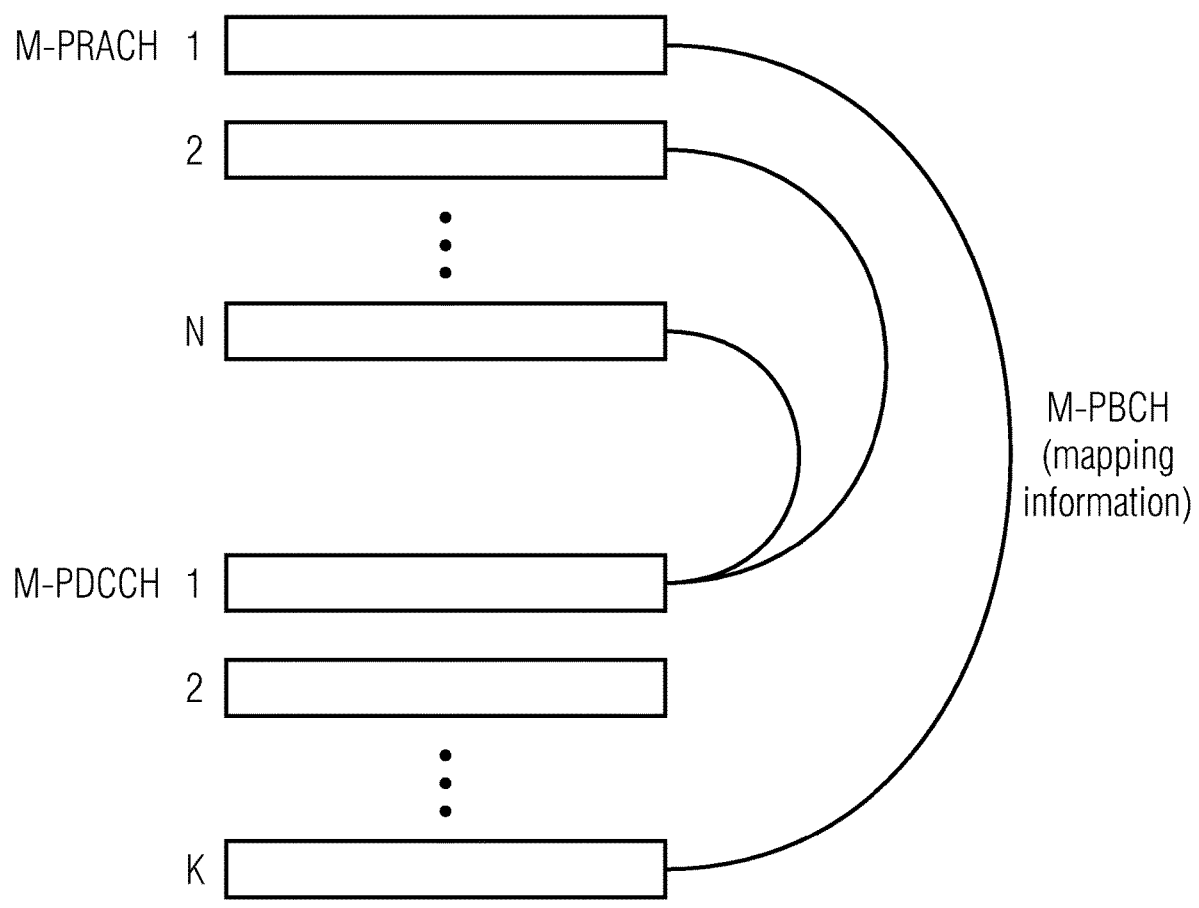
FIG. 10 shows an example for a M-RACH to M-PDCCH mapping.

FIG. 10 shows an example of the above mentioned M-RACH to M-PDCCH mapping in a system with 1 ... N M-RACH channels and 1 ... K M-PDCCH channels, wherein N may be larger, smaller or equal to K. A predefined M-PDCCH of the original RACH may be used for the initial RACH response and, after the initial random access, a particular user may be assigned to a different control channel. This mapping may be stored at the receiver or may be broadcast using the M-PBCH in case other UEs may use this information. FIG. 10 shows an example of N M-RACH and K M-PDCCH channels, each of which may be transmitted in a dedicated frequency band. In accordance with examples, each of the channels 1 ... N and 1 ... K may be dedicated channels including only the M-PARCH or the M-PDCCH. The mapping information provided by the M-PBCH may only indicate the frequency band where to find the control information. In accordance with other embodiments, the respective channels may also include other information, and the respective random access information and control information may be placed at specific positions within the channel. In this case, the mapping information provided by the M-PBCH may indicate the frequency band where to find the control information and a location within the respective frequency band, for example what resource elements within a M-subframe are allocated to the control information.

In the example of FIG. 10, several dedicated random access channels may be provided, and the channels or frequency bands may be separated by the available power so that battery powered devices may be assigned to less congested M-RACH channels than UEs where may be several retransmissions are acceptable. This may be signaled, as mentioned above, in the system information block depending on the UE category, the information type (delay tolerant information/alarm/emergency) or USIM (Universal Subscriber Identity Module) priority class. In response to a random access, each band may have a dedicated M-RACH response channel (M-PDCCH) or a dedicated M-RACH sequence may depend on the control channel the UE is listening to.

Figure 11A:
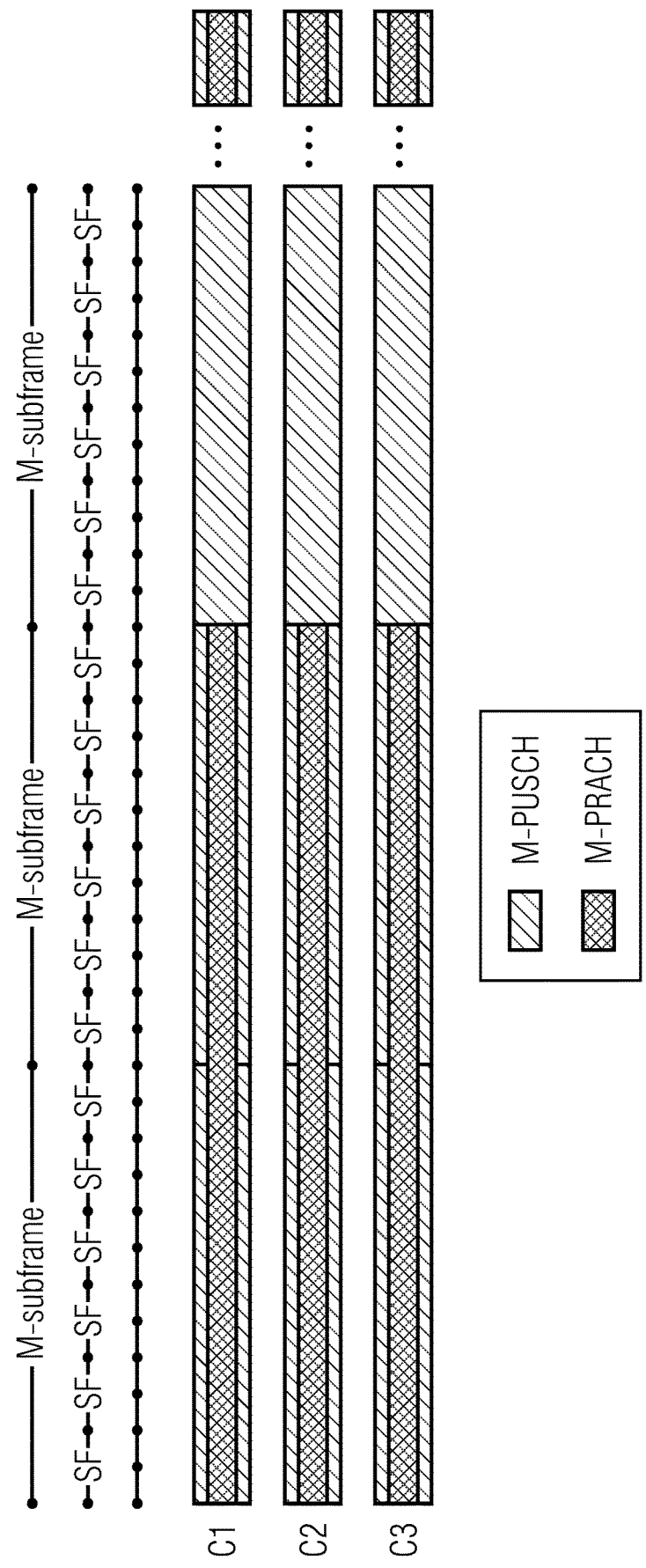
Figure 11B:
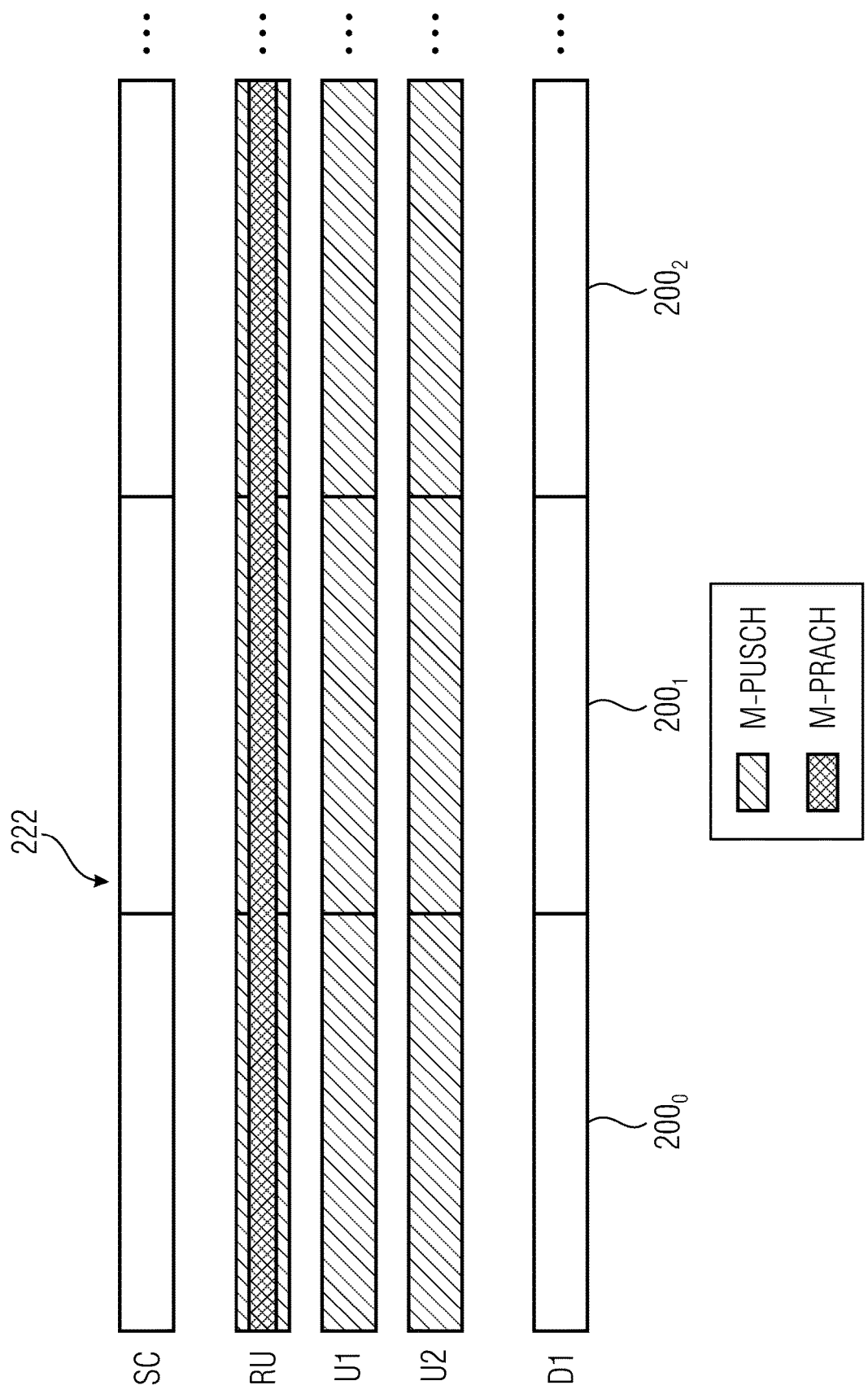
FIG. 11(b) shows the signaling in accordance with the inventive approach.

FIG. 11 shows an example of an NB-IoT system using a dedicated M-RACH channel. In a similar way as FIG. 8, FIG. 11(a) shows a conventional approach for signaling the M-RACH channel, and FIG. 11(b) shows the signaling in accordance with the inventive approach.

In FIG. 11(a), three frequency bands or channels C1 to C3 are shown, and the M-RACH are provided in the first and second M-subframes $200_0$ and $200_1$. The following M-frames are provided for the M-PUSCH. Thus, in accordance with the conventional approach, random access is only possible once the random access information has been obtained from the first and/or second M-subframes $200_0$ and $200_1$.

In accordance with embodiments of the present invention as depicted in FIG. 11(b), in addition to the synchronization channel SC as explained above with reference to FIG. 8 and in addition to the channel D1 not including any connecting information, further channels or frequency bands RU, U1, U2 are provided which may also not include connecting information. A narrowband carrier of a frequency band RU is provided for the random access information, and additional uplink channels U1, U2 are provided on separate carriers or frequency bands. Thus, while the conventional approach in FIG. 11(a) has on each narrowband carrier C1-C3 its own M-RACH and UL resources, in accordance with the inventive approach, the resources are reorganized to enable a constant random access on the dedicated channel RU while the additional channels U1 and U2 provide additional uplink resources.

In accordance with other embodiments, the M-RACH and UL resources in the conventional approach of FIG. 11(a) may be reorganized in a different way such that in each channel C1-C3 the UL resources and the random access resources are kept in the same channel. However, other than in FIG. 11(a) the random access slots do not start at the same time but are shifted. FIG. 12 describes embodiments for shifted random access slots by reorganizing the resources in a way as described above.

FIG. 12(a) shows a conventional arrangement of the random access sequence in a NB-IoT signal. When considering three frequency bands or carriers C1 to C3, in each of the channels the random access information is synchronized among the channels and occurs in each channel at the same time at an interval $\Delta t_1$.

In accordance with embodiments of the present invention, this synchronization is avoided. Rather, as is shown in FIG. 12(b), within the respective channels C1-C3, the random access information is shifted with respect to each other so that the interval $\Delta t_2$ between the random access slots is shorter than the interval $\Delta t_1$ in the conventional approach, thereby allowing the access time to be reduced, for example for an IoT device that is capable of listening to each of the frequency bands C1-C3.

FIG. 12(c) shows another embodiment of the inventive approach allowing for a reduced signaling by the transmitter providing the signals in the frequency bands C1 to C3. In the case of three frequency bands, the random access slot is signaled when observing all three channels with the same time interval $\Delta t_1$. However, the first random access slot is signaled on the first carrier, the second one is signaled on the second carrier and third one is signaled in the third carrier. Following this, the next, fourth random access slot is again signaled in the first carrier. This reduces the signaling in each channel that may be used by the transmitter.

In accordance with the embodiments described above, function specific narrowband channels allow simple (low complexity) receivers to run on a single narrowband channel at a time. The receiver module of the receiver (see FIG. 7) may provide for a half-duplex operation, i.e., allows operating on a single frequency band at one time. In other embodiments, more complex devices may be provided, for example receivers operating in a carrier aggregation or wideband reception mode allowing to receive data on multiple frequency bands, so as to aggregate several of the above described narrowband channels or even combinations of standard LTE channels and narrowband channels. This aggregation allows such devices to synchronize faster and to have higher transmission rates as well as to simultaneously receive control and user data. More complex transceivers (IoT device or base station) may operate in a full-duplex mode with simultaneous transmission and reception of one or several narrowband carriers.

Figure 13:
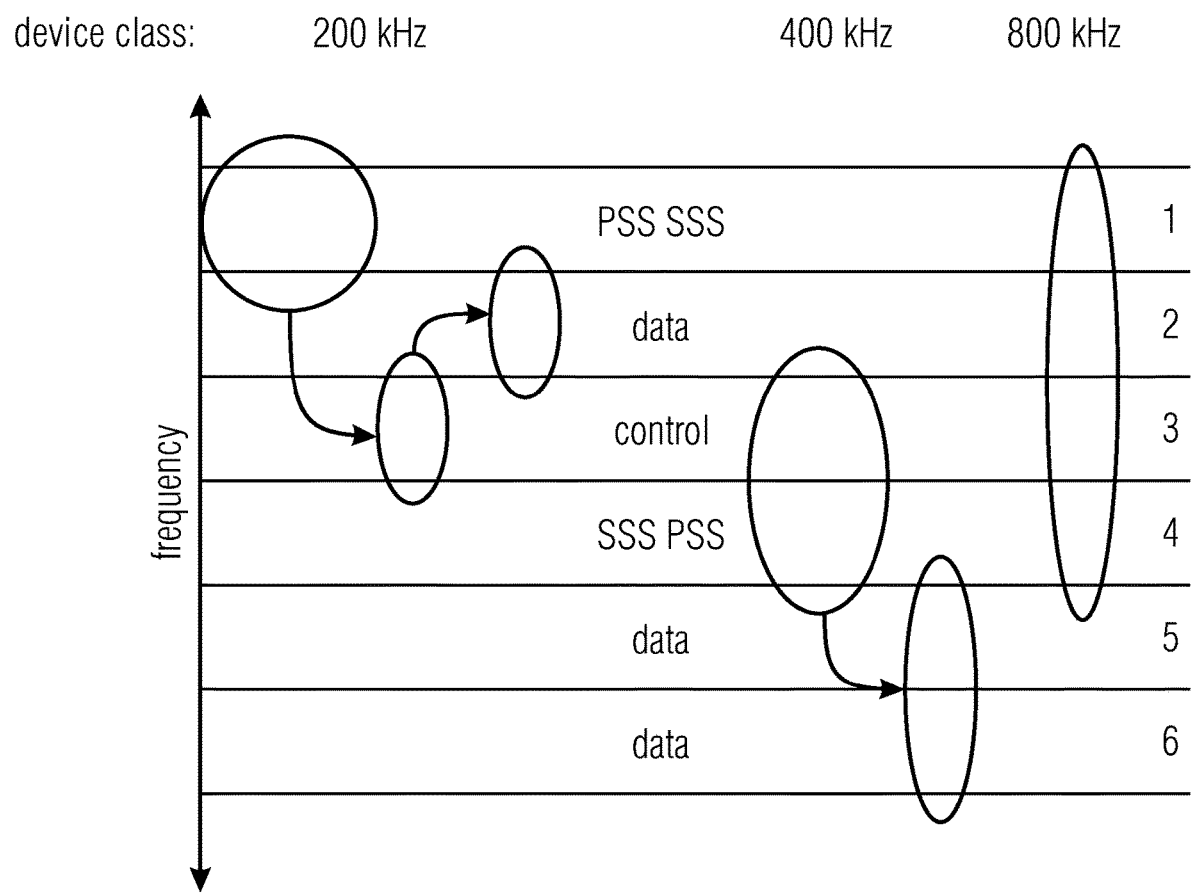
FIG. 13 shows a schematic view of a narrowband IoT system using six frequency bands or channels and how devices having different receiving modules make use of the respective channels.

FIG. 13 shows a schematic view of a narrowband IoT system using six frequency bands or channels and how devices having different receiving modules make use of the respective channels. In FIG. 13, the first channel is a synchronization channel transmitting at least the information PSS and SSS. The second channel is a data channel and the third channel is a control channel. The fourth channel, again, is a synchronization channel, and the fifth and sixth channels are, again, data channels. The second, third, fifth and sixth channels are dedicated channels that, in accordance with embodiments, do not include any information allowing a receiver to connect to the communication network. In the embodiment of FIG. 13, three different device classes are assumed, namely a 200 kHz device that has a receiver module that operates on a single narrowband channel at one time. In accordance with the inventive approach, the signals transmitted in the respective frequency bands 1 to 6 are, in frequency bands 1 and 4, the connecting information and band information and the remaining frequency bands 2, 3, 5 and 6 include data and control information but are free of any connecting information so that a receiver listening to bands 2, 3, 5 and 6 cannot set up a connection to the communication network.

The 200 kHz receiver initially listens to frequency band 1 to receive the connecting information and band information. Once the receiver connected to the communication network, on the basis of the band information in frequency band 1, the receiving module is tuned to the frequency band 3 to derive control information for operating the receiver. The control information includes further band information controlling the receiver to switch the receiving module to the frequency band 2 to receive or send data.

FIG. 13 further shows a 400 kHz device which is able to listen to two frequency bands simultaneously and the device is tuned to listen simultaneously to two adjacent frequency bands 3 and 4 initially so as to obtain the connecting information as well as the control information and, on the basis of the band information, the receiver may be tuned to the frequency bands 5 and 6 so as to receive/transmit data on these bands.

A further device shown in FIG. 13 is a 800 kHz device simultaneously listening to four frequency bands 1 to 4 of which bands 1 and 4 include connecting information which allows for a faster connection of such a device as information for connecting from both synchronization bands 1 and 4 may be used. Control information is found on band 3, is signaled by the synchronization bands, and data may be sent/received on band 2.

In the examples described above with reference to FIG. 13, the 400 kHz and 800 kHz devices are shown to listen to adjacent frequency bands which may be achieved by an appropriate broadband receiver. However, in accordance with other examples, the 400 kHz and 800 kHz devices may include separate narrowband receivers listening only to one frequency band and operated simultaneously, and when tuning the respective narrowband receiver modules to adjacent frequency bands, a listening scheme as shown in FIG. 13 may be achieved. In other examples, the 400 kHz and 800 kHz devices may operate on non-adjacent frequency bands, for example by tuning separate narrowband or broadband receivers to different frequencies so that, for example, in case of the 400 kHz device, a first narrowband receiving module may listen to the frequency band 1 for obtaining the connecting information and a second receiving module listens to the frequency band 3 to obtain the control information. In a similar way, the 800 kHz device may listen to separate frequency bands.

Figure 5A:
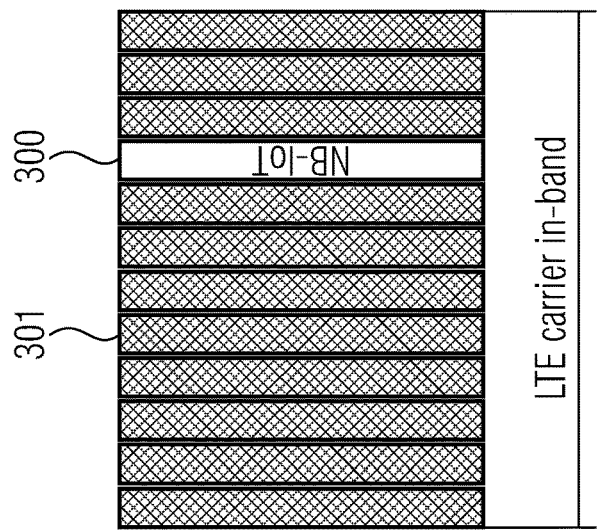
Figure 6:
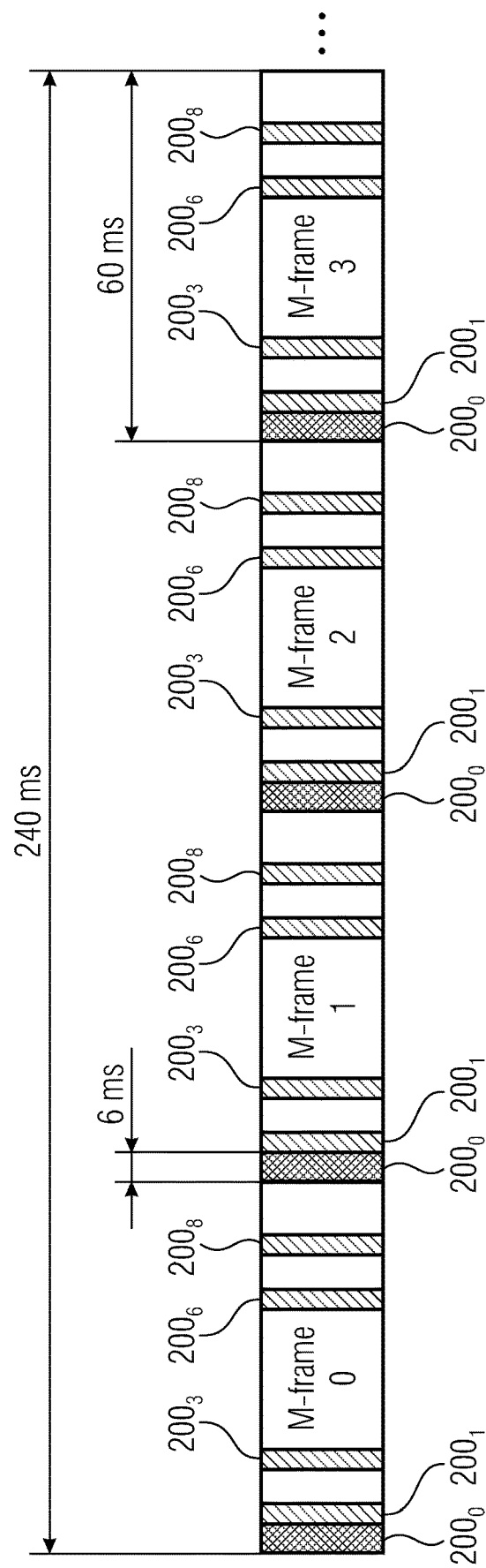
FIG. 6 shows the distribution of M-subframes including information for establishing a connection over a plurality of NB-IoT radio frames or M-frames.

In case of the 400 kHz and 800 kHz devices, higher data rates and/or simultaneous reception of control and data channels can be achieved. Likewise, if the UE has a wideband transmitter, or in case it has several narrowband transmitters, it may use several bands simultaneously, which may also be adjacent bands, as frequency bands 5 and 6 in FIG. 13 which allows for a higher data rate in the uplink. Further, by hopping between several channels in the downlink and uplink, a frequency diversity may be achieved. In the example of FIG. 13, when using the NB-IoT system together with an LTE band as explained above with reference to FIGS. 5(a) and 5(c), the lower two data channels 5 and 6 may be dynamically shared between the narrowband IoT and LTE users.

Figure 1:
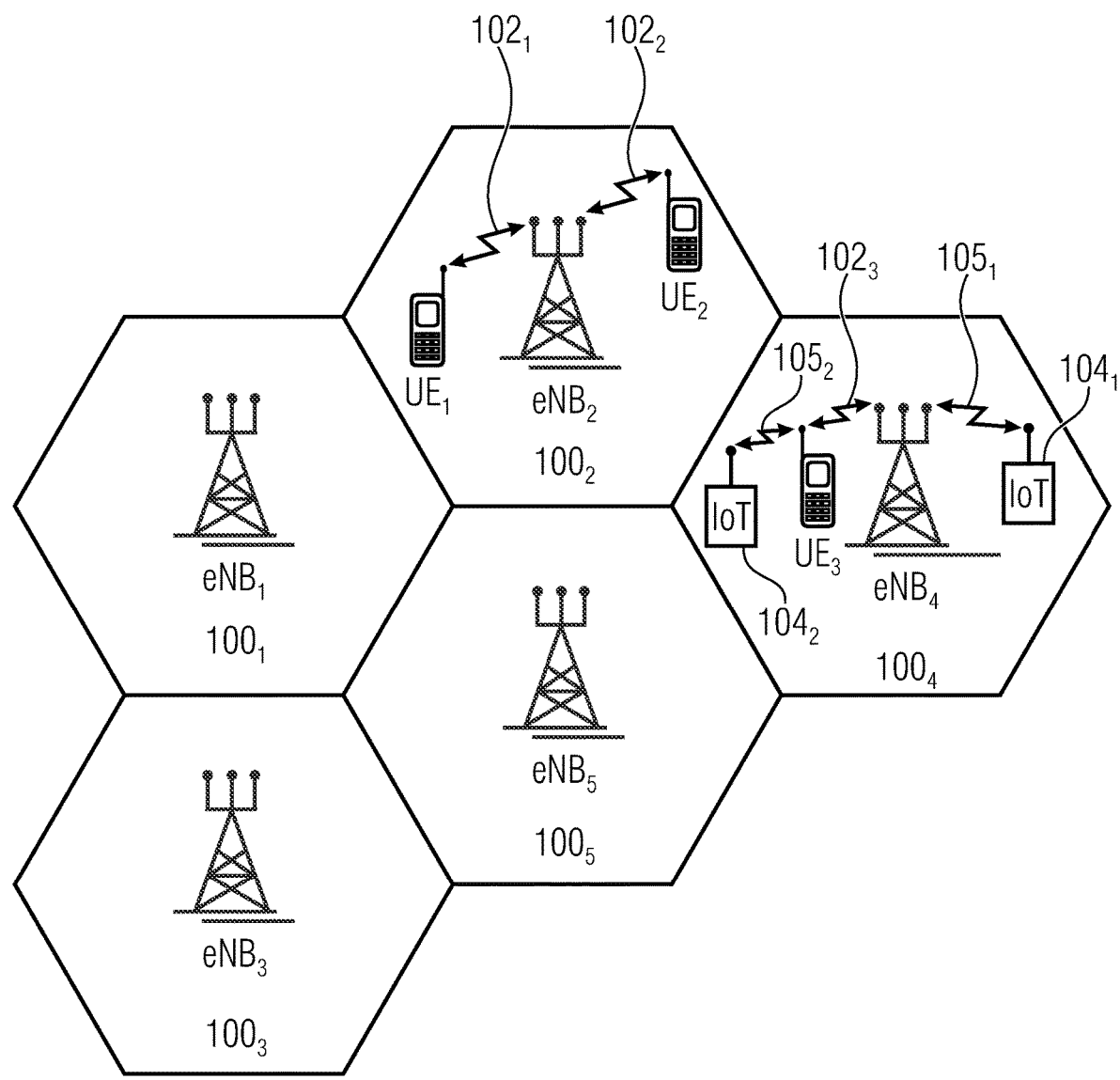
FIG. 1 shows a schematic representation of an example of a wireless communication system.
Figure 14:
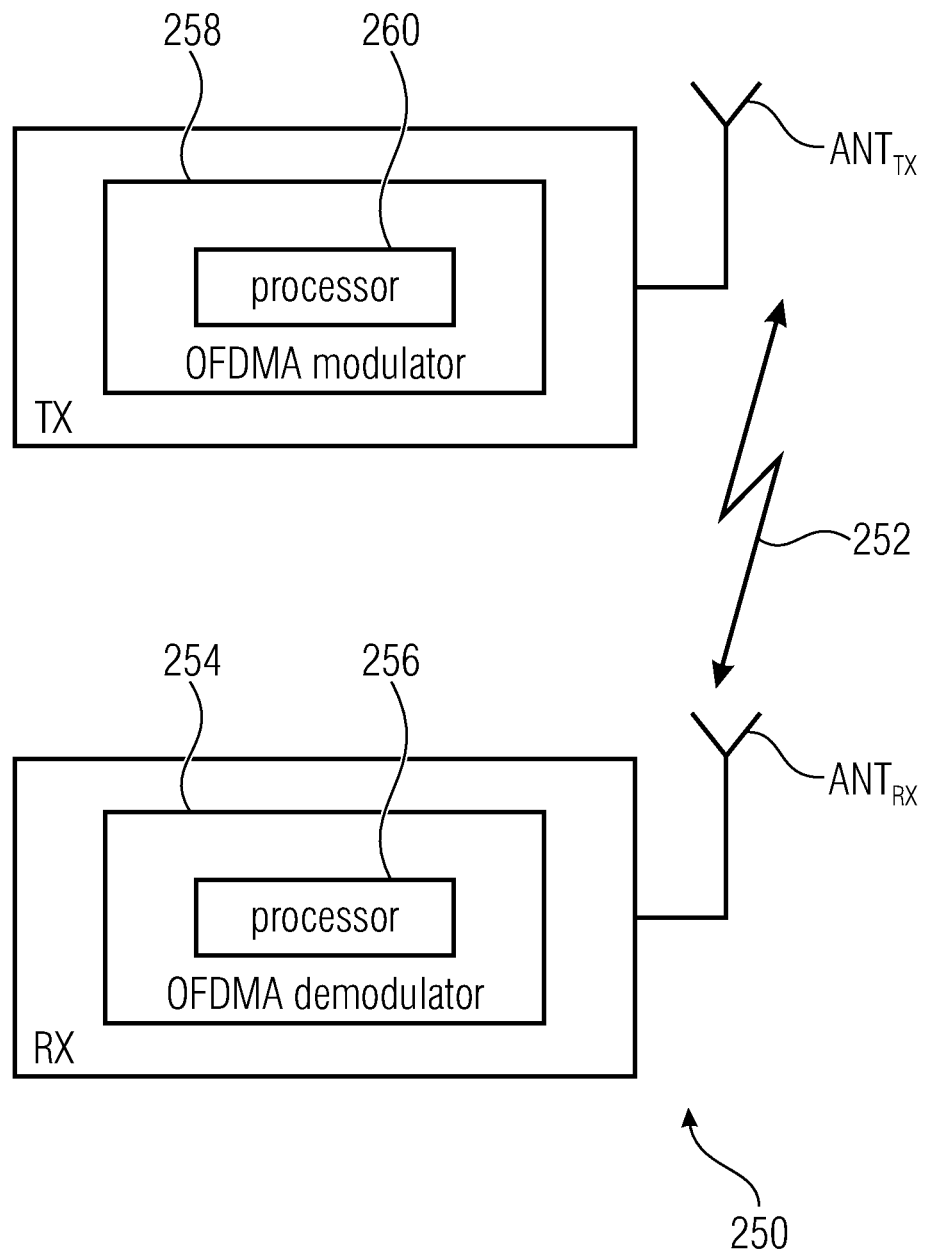
FIG. 14 is a schematic representation of a wireless communication system for transmitting information from a transmitter to a receiver.

Embodiments of the present invention may be implemented in a wireless communication system as depicted in FIG. 1 including base stations, users, like mobile terminals, and IoT devices. FIG. 14 is a schematic representation of a wireless communication system 250 for transmitting information from a transmitter TX to a receiver RX. The transmitter TX includes at least one antenna $ANT_{TX}$ and the receiver RX includes at least one antenna $ANT_{RX}$. In other embodiments, the transmitter TX and/or the receiver RX may include more than one antenna to implement a MIMO, SIMO or MISO. As is indicated by the arrow 252 signals are transmitted between the transmitter TX and the receiver RX via a wireless communication link, like a radio link. The transmission may be in accordance with the OFDMA communication approach.

The signaling between the transmitter TX and RX is in accordance with the above described embodiments of the present invention For example, the receiver RX receives via the antenna the radio signal from the transmitter TX and applies the signal to the OFDMA demodulator 254 including a signal processor 256 for processing the radio signal. The radio signal has at least a first frequency band SC and a second frequency band D1. The first frequency band SC includes a first signal, the second frequency band D1 includes a second signal, and each of the first signal and the second signal has a plurality of frames, each frame having a plurality of subframes. One or more of the subframes of the first signal comprise connecting information allowing the receiver to establish a connection with the wireless communication system and band information indicating the second frequency band D1. All of the subframes of the second signal are free of any connecting information. The receiver RX establishes a connection with the wireless communication system using the connecting information, and, after having established the connection with the wireless communication system and responsive to the band information, operates in the second frequency band D1.

The transmitter TX comprises an OFDMA modulator 258 comprising a signal processor 260 to generate a signal to be transmitted to the receiver RX. The transmitter TX may transmit a radio signal having at least a first frequency band SC and a second frequency band D1. The first frequency band SC includes a first signal, the second frequency band D1 includes a second signal, and each of the first signal and the second signal has a plurality of frames with each frame having a plurality of subframes. One or more of the subframes of the first signal comprises connecting information allowing the receiver RX to establish a connection with the wireless communication system and band information indicating the second frequency band D1. All of the subframes of the second signal are free of any connecting information. The transmitter includes the OFDMA modulator operating so as allocate the connecting information and the band information as well as other information in the subframes in the respective frequency bands.

Figure 15:
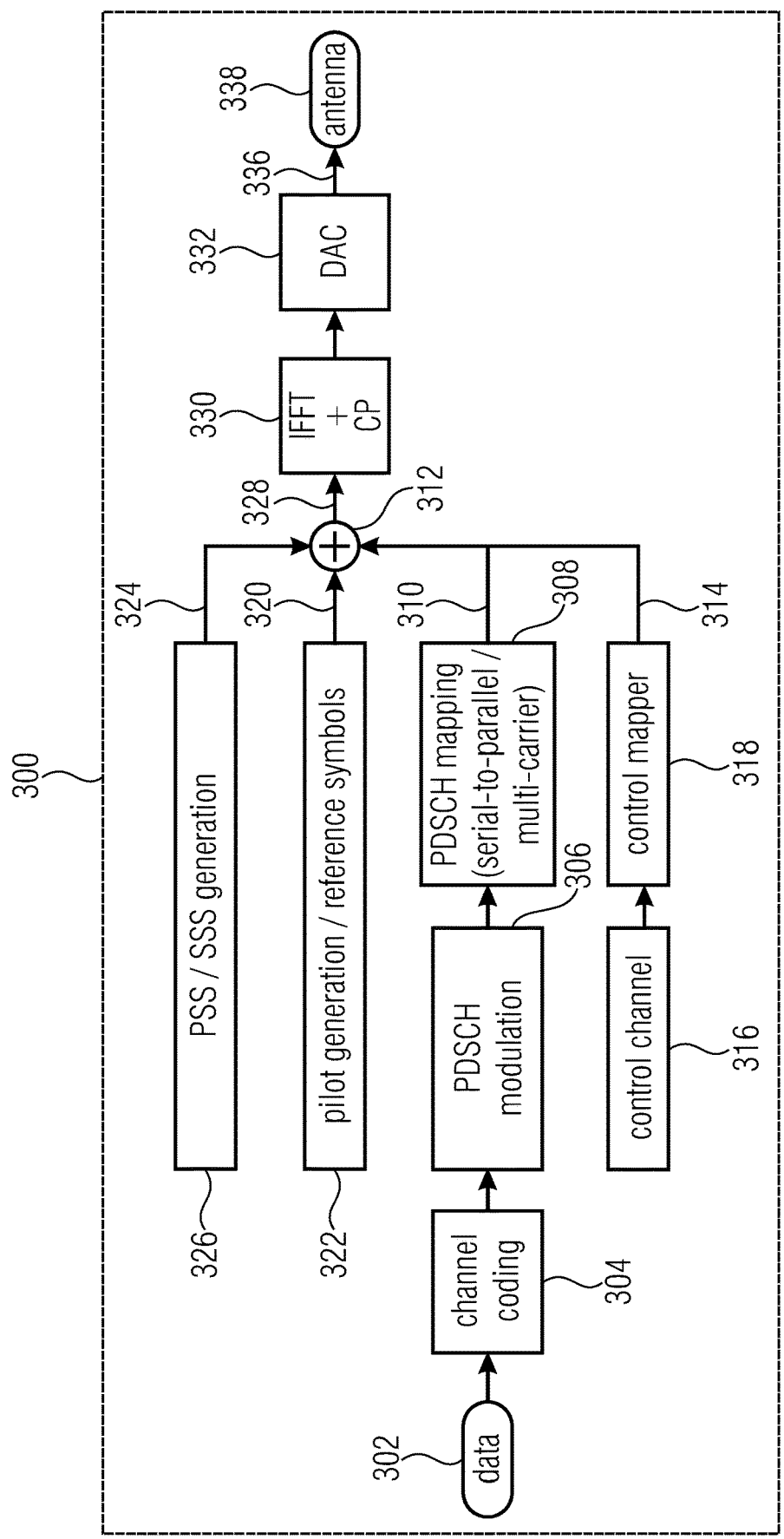
FIG. 15 is a schematic representation of transmitters in a wireless communication system for transmitting data or information to a receiver in accordance with embodiments.

FIG. 15 is a block diagram of a transmitter 300 in a wireless communication system for transmitting a radio signal to a receiver in accordance with the embodiments described above. The transmitter 300 receives data 302 that is encoded by the channel encoder 304, modulated by the modulator 306 and mapped to the multiple carriers or frequency bands by the mapper 308. Control signals 314 are provided by the control channel unit 316 and the control mapper 318, pilot symbols 320 are provided by the pilot symbol generator 322, and PSS/SSS signals 324 are provided from the PSS/SSS signal generator 326. The signals are combined by the combiner 312 such that a first signal to be transmitted in a first frequency band SC is provided, and such that a second signal to be transmitted in a second frequency band D1 is provided. The signals are combined such that the first signal has one or more subframes including connecting information allowing a receiver to establish a connection with the wireless communication system and band information indicating the second frequency band D1, and such that all of the subframes of the second signal are free of any connecting information. The combined signals 328 are provided to the IFFT+CP block 330, and are converted by the DAC 332 into the analog domain. The analog signal 336 is processed for radio transmission and eventually transmitted by the antenna 338.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A receiver,
wherein the receiver is configured to receive and process a radio signal, the radio signal comprising at least a first frequency band and a second frequency band, the first frequency band comprising a first signal, the second frequency band comprising a second signal, and each of the first signal and the second signal comprising a plurality of frames, each frame comprising a plurality of subframes,
wherein one or more of the subframes of the first signal comprises connecting information allowing a receiver to establish a connection with a wireless communication system,
wherein all of the subframes of the second signal are free of any connecting information so that a receiver listening to the second signal cannot set up a connection with the wireless communication system,
wherein the receiver is configured to establish the connection with the wireless communication system using the connecting information, and, after having established the connection with the wireless communication system and responsive to band information indicating the second frequency band, to operate in the second frequency band,
wherein the connecting information comprises system information, wherein the system information provides several random access channels, RACHs, usable by the receiver for random access, and
wherein the system information indicates a periodicity of a random access slot in a frequency band and a weighted random choice of the RACHs usable by the receiver for random access.

2. The receiver of claim 1, wherein each subframe of the first signal comprises the connecting information.

3. The receiver of claim 1, wherein the connecting information comprises synchronization information or system information.

4. The receiver of claim 1, wherein one or more of the subframes of the first signal further comprises one or more of:
- a region for a control channel, the receiver configured to control an operation of the receiver and/or a communication with the wireless communication system using information in the control channel,
- a region for a random access channel,
- a region for a downlink channel, and/or
- a region for an uplink channel, and/or
- a region for an uplink control channel, and/or
- a region for a multicast DL or UL channel.

5. The receiver of claim 1, wherein the radio signal comprises a third frequency band, the third frequency band comprising the first signal.

6. The receiver of claim 1, wherein the radio signal comprises a fourth frequency band, the fourth frequency band comprising the second signal.

7. The receiver of claim 6, wherein the second signal in the second frequency band comprises further band information indicating the fourth frequency band, the receiver configured to operate in the second frequency band responsive to the further band information.

8. The receiver of claim 6, wherein the band information indicates for a certain receiver the second and fourth radio frequency bands dependent on a capacity on the respective bands, dependent on the kind of receiver, dependent on a certain function provided by a receiver, or dependent on a message type.

9. The receiver of claim 5, wherein the receiver is configured to hop between the plurality of frequency bands.

10. The receiver of claim 1, wherein one or more of the subframes of the second signal comprises one or more of
- a region for a control channel, the receiver configured to control an operation of the receiver and/or a communication with the wireless communication system using information in the control channel,
- a region for a random access channel,
- a region for a downlink channel,
- a region for an uplink channel and/or
- a region for a multicast DL or UL channel.

11. The receiver of claim 1, wherein all of the subframes of the second signal comprises
- only the region for a control channel,
- only the region for a random access channel,
- only the region for a downlink channel,
- only the region for an uplink channel, or
- a region for a multicast DL or UL channel.

12. The receiver of claim 1, comprising a receiver section configured to receive the first frequency band and to be switched from the first frequency band to the second frequency band responsive to the system information, the receiver configured to switch from the first frequency band to the second frequency band using the band information.

13. The receiver of claim 1, comprising a receiver section configured to simultaneously receive a plurality of frequency bands, and to simultaneously process the first and second signals.

14. The receiver of claim 1, comprising a transmitter section configured to simultaneously transmit a signal in a plurality of frequency bands.

15. The receiver of claim 1, wherein the receiver is an IoT device, the wireless communication system is configured to serve non-IoT devices and IoT devices, and the first and second frequency bands comprise a bandwidth that is narrower than a bandwidth of a frequency band within which the non-IoT devices are operable.

16. The receiver of claim 1, wherein the first signal comprises the band information indicating the second frequency band.

17. A transmitter,
wherein the transmitter is configured to transmit a radio signal, the radio signal comprising at least a first frequency band and a second frequency band, the first frequency band comprising a first signal, the second frequency band comprising a second signal, and each of the first signal and the second signal comprising a plurality of frames, each frame comprising a plurality of subframes,
wherein one or more of the subframes of the first signal comprises connecting information allowing a receiver to establish a connection with a wireless communication system,
wherein all of the subframes of the second signal are free of any connecting information so that a receiver listening to the second signal cannot set up a connection with the wireless communication system,
wherein the connecting information comprises system information,
wherein the system information provides several random access channels, RACHs, usable by the receiver for random access, and
wherein the system information indicates a periodicity of a random access slot in a frequency band and a weighted random choice of the RACHs usable by the receiver for random access.

18. A wireless communication system, comprising:
a receiver as claimed in claim 1; and
a transmitter as claimed in claim 17.

19. A method, comprising:
receiving and processing, by a receiver of a wireless communication system, a radio signal, the radio signal comprising at least a first frequency band and a second frequency band, the first frequency band comprising a first signal, the second frequency band comprising a second signal, and each of the first signal and the second signal comprising a plurality of frames, each frame comprising a plurality of subframes, wherein one or more of the subframes of the first signal comprises connecting information allowing a receiver to establish a connection with a wireless communication system, and wherein all of the subframes of the second signal are free of any connecting information so that a receiver listening to the second signal cannot set up a connection with the wireless communication system,
establishing a connection of the receiver with the wireless communication system using the connecting information, and
after having established the connection with the wireless communication system, operating the receiver in the second frequency band responsive to band information indicating the second frequency band,
wherein the connecting information comprises system information, wherein the system information provides several random access channels, RACHs, usable by the receiver for random access, and
wherein the system information indicates a periodicity of a random access slot in a frequency band and a weighted random choice of the RACHs usable by the receiver for random access.

* * * * *